US005761467A

United States Patent [19]

Ando

[11] Patent Number: 5,761,467
[45] Date of Patent: Jun. 2, 1998

[54] SYSTEM FOR COMMITTING EXECUTION RESULTS WHEN BRANCH CONDITIONS COINCIDE WITH PREDETERMINED COMMIT CONDITIONS SPECIFIED IN THE INSTRUCTION FIELD

[75] Inventor: Hideki Ando, Hyogo, Japan

[73] Assignee: Mitsubishi Denki Kabushiki Kaisha, Tokyo, Japan

[21] Appl. No.: 304,441

[22] Filed: Sep. 12, 1994

[30] Foreign Application Priority Data

Sep. 28, 1993 [JP] Japan ................................ 5-241162
Nov. 12, 1993 [JP] Japan ................................ 5-283521
Jun. 15, 1994 [JP] Japan ................................ 6-133106

[51] Int. Cl.$^6$ ........................................... G06F 9/38
[52] U.S. Cl. .................. 395/376; 395/182.14; 395/555; 395/800
[58] Field of Search ................................ 395/375, 550, 395/800, 182.14

[56] References Cited

U.S. PATENT DOCUMENTS

| 5,129,079 | 7/1992 | Miyashita | 395/375 |
| 5,404,470 | 4/1995 | Miyake | 395/375 |
| 5,421,022 | 5/1995 | McKeen et al. | 395/800 |
| 5,459,845 | 10/1995 | Nguyen et al. | 395/375 |

OTHER PUBLICATIONS

"Highly Concurrent Scalar Processing", Hsu et al., IEEE 1986, pp. 386–395.
"Effective Compiler Support For Predicated Execution Using the Hyperblock", Mahlke et al., IEEE 1992, pp. 45–54.
"Support for Speculative Execution in High–Performance Processors", Sumith, Graduate Studies of Stanford University, Nov. 1992.
"Sentinel Scheduling for VLIW and Superscalar Processors", Mahlke et al., ASPLOS V, Oct. 1992, pp. 238–247.
"Boosting Beyond Static Scheduling in a Superscalar Processor", Smith et al., IEEE 1990, pp. 344–354.
"Effect Superscalar Performance Through Boosting", Smith et al., Computer Systems Laboratory Stanford University, pp. 1–12.
"Support for Speculative Execution in High–Performance Processors", Smith, Computer Systems Laboratory, Nov. 1992, pp. 1–133.

Primary Examiner—Ken S. Kim
Attorney, Agent, or Firm—Lowe, Price, LeBlanc & Becker

[57] ABSTRACT

The microprocessor which processes instructions with commit conditions in parallel includes a sequential register file for storing result data of sequential instructions; a shadow register file for storing result data of speculative instructions; a TF register including a plurality of entries each holding information indicating that the commit condition is "true", "false" or "undetermined"; an execution control circuit for comparing the commit condition and a corresponding entry in TF register, storing the result data in sequential register file if the instruction is sequential, and storing the result data in shadow register file if the instruction is the speculative; and a commit control circuit for storing the commit condition and transferring the result data stored in the shadow register file to sequential register file when a coincidence is found between true/false for the commit condition and true/false in TF register 10.

21 Claims, 23 Drawing Sheets

K1,L1~L3 always ? I1; TF [1] ? I2; /TF [1] ? I3; TF [1] & TF [2] ? I4;

always ? C1; always ? C2;

TF [1] & /TF [2] ? J1; /TF [1] ? J2; TF [1] & TF [2] ? J3;

I1 : r2=r10+r11
I2 : r4=r12+r13
I3 : r5=r12-r13
I4 : r6=r14+r15
C1 : if(r2<r3) TF [1] =true ; else TF [1] =false
C2 : if(r4==r5) TF [2] =true ; else TF [2] =false
J1 : go to M2
J2 : go to M1
J3 : go to M3

```
always ? I1 ; TF [1] ? I2 ; / TF [1] ? I3 ; TF [2] ? I4 ;
always ? C1 ;
TF [1] ? C2 ;
TF [1] ? J1 ; / TF [1] ? J2 ; TF [2] ? J3 ;
```

FIG.19

```
always ? I1 ;           TF [1] ? I2 ;

/ TF [1] ? I3 ;         / TF [1] ? C2 ;

always ? C1 ;           TF [2] ? I4 ;

| F1 | RA1 | RB1 |
|---|---|---|
| F2 | RA2 | RB2 |
| F3 | RA3 | RB3 |
| ⋮ | ⋮ | ⋮ |
| F32 | RA32 | RB32 |

1ST REGISTER FILE 65    2ND REGISTER FILE 66

FIG.24

```
always ? C1 ;
TF [1] ? I2 ; /TF [1] ? I3 ;
always ? C2 ;
TF [1] & TF [2] ? I4 ;
always ? jump (ADDRESS IN 3RD CYCLE IN MAIN PROGRAM)
```

FIG.25

```
recoveryCodeAddress = jump Table [EPC] ;
go to recoveryCodeAddress;
```

FIG.26

```
I10 ; TF [1] ? r1=r2+r3 ;
I11 ; TF [1] ? r1=r1+r2 ;
I12 ; always ? if (r3==r2) TF [1] = true, else TF [1] = false ;
```

SYSTEM FOR COMMITTING EXECUTION RESULTS WHEN BRANCH CONDITIONS COINCIDE WITH PREDETERMINED COMMIT CONDITIONS SPECIFIED IN THE INSTRUCTION FIELD

BACKGROUND OF THE INVENTION

1. Field of the Invention

The present invention relates generally to methods of processing an instruction with a commit condition and apparatuses therefor, and more specifically, to a method of processing a plurality of instructions each having a corresponding commit condition under a number of circumstances and an apparatus therefor. Herein, the commit condition is formed of conditions necessary for finally processing a corresponding instruction.

2. Description of the Background Art

FIG. 28 is a block diagram showing the construction of a microprocessor as a conventional instruction processor.

Referring to FIG. 28, the microprocessor includes a register file 1 formed of a plurality of registers, an ALU (Arithmetic and Logical Unit) 2, a memory 3 for holding instructions, a program counter 4 holding addresses for instructions to be executed and applying such an address to memory 3, and an increment circuit 5 for incrementing program counter 4.

The microprocessor further includes an instruction register 6 for holding an instruction fetched from memory 3, an instruction decoder 7 for decoding the instruction and generating a control signal for controlling reading/writing from to register file 1 and a control signal for controlling FLU 2, a test circuit 8 for determining a branch condition based on data read out from register file 1, and a circuit 9 for calculating a target address in response to a control signal from test circuit 8.

With the microprocessor, an instruction to be executed among instructions held by memory 3 is first addressed by program counter 4. The addressed instruction is fetched from memory 3 and held in instruction register 6. The instruction held by instruction register 6 is decoded by instruction decoder 7 and reading/writing from/to register file 1 is controlled and ALU2 is controlled in response to the content of the instruction.

If the instruction fetched by instruction register 6 is an operation instruction, data is respectively read out from two registers in register file 1. These pieces of read out data are operated by ALU2, and the resultant data is written in a register in register file 1.

Meanwhile, if the instruction fetched by instruction register 6 is a branch instruction, two pieces of data read out from register file 1 are applied to test circuit 8. Based on these pieces of data, test circuit 8 determines whether or not the branch condition is satisfied. More specifically, test circuit 8 determines whether the condition is true or false.

If the condition is true, the target address is calculated by target address calculation circuit 9 for application to program counter 4. If the condition is false, program counter 4 is incremented.

In general, a microprocessor sometimes must conduct a processing called "exception" in the midst of executing an instruction. If, for example, in a virtual storage microprocessor, an instruction (load instruction) to fetch data from memory 3 to a register in register file 1 is executed, the data to be loaded is sometimes not present on memory 3. Such an exception is generally called "page fault". In such a case, a special routine called "exception handler" must be called in order to load data from a disc to memory 3. Subsequently, the processing must be resumed from the instruction which has caused the exception.

FIG. 10 is a flow chart showing an example of a program. According to the flow chart, after condition C1:if(R<R3) in a basic block K1 is determined, either a basic block L1 or L3 is initiated. More specifically, instruction I2:r4=r12+r13 in basic block L1 and instruction I3:r5=r12−r13 are to be executed based on condition C1.

In the conventional microprocessor described above, any of instructions I2 and I3 cannot be executed until condition C1 is determined. For example, data resulting from execution of instruction I2 is written in a register r4 in register file 1 only when condition C1 is true. To write data resulting from execution of instruction I2 in register r4 with condition C1 being false destroys data previously held by register r4.

Thus, the conventional microprocessor is not capable of executing instructions I2, I3 and I4 to be executed based on conditions C1 and C2 until conditions C1 and C2 are determined.

Although microprocessors having a plurality of ALU's have been suggested in recent years, such a microprocessor still cannot execute an instruction to be executed based on one or more conditions before determining these conditions. Some of the plurality of ALU's are not operating at all for some moments, and sufficiently high speed operation processing cannot be achieved.

SUMMARY OF THE INVENTION

It is an object of the invention to provide a microprocessor capable of executing an instruction to be executed after determination of a condition before such a determination is made.

Another object of the invention is to provide a microprocessor capable of processing instructions at a higher speed.

Yet another object of the invention is to provide a microprocessor capable of processing an instruction upon occurrence of an exception.

A method of processing an instruction with a commit condition according to one aspect of the invention processors a plurality of instructions each having a corresponding commit condition under a plurality of conditions.

The commit condition is formed of any of the above conditions necessary for finally processing a corresponding instruction. The above processing method includes steps of determining at least one condition selected from the above conditions; comparing a commit condition corresponding to at least one instruction selected from the above instructions and the above condition, executing the selected instruction after the comparison and producing result data; holding the produced result data in a deterministic manner in a first case in which true or false for all the conditions in the corresponding commit condition coincide with true or false for the already determined condition, and provisionally holding the produced result data in a second case in which true or false for any of the corresponding commit condition coincides with true or false for the already determined condition and the other conditions in the corresponding commit condition are not yet determined; and re-holding the resultant data provisionally held in a deterministic manner at the time of a commit when true or false for all the conditions in the corresponding commit condition coincides with true or false for the already determined condition.

A processor for an instruction with a commit condition according to another aspect of the invention processes a plurality of instructions each having a corresponding commit condition under a plurality of conditions. The above commit condition is formed of any of conditions necessary for finally processing a corresponding instruction. The processor includes an operation unit, a data hold unit, a true/false hold unit, an execution control circuit, and a commit control circuit. The operation unit executes at least one instruction selected from the above instructions, and determines at least one condition selected from the above conditions. The data hold unit deterministically or provisionally holds result data produced by execution of the selected instruction by the operation unit. The true/false hold unit includes a plurality of entries corresponding to the plurality of conditions. The entries each hold first condition information of a corresponding condition being true, second condition information of the corresponding condition being false, or third condition information of the true or false for the corresponding condition being undetermined The execution control circuit compares the corresponding commit condition with the condition information obtained from the true/false hold unit, (i) controls the data hold unit to hold the result data deterministically in a first case in which true or false for all the conditions in the corresponding commit condition correspondingly coincides with the condition information corresponding to all the conditions, and (ii) controls the data hold unit to provisionally hold the result data in a second case in which true or false for any condition in the corresponding commit condition correspondingly coincides with condition information corresponding to that condition, and condition information correspondingly to the other conditions in the corresponding commit condition is the third condition information. The commit control circuit compares the corresponding commit condition with the condition information obtained from the true/false hold unit, and controls the data hold unit to re-hold deterministically the result data which it has provisionally held, at the time of a commit in which true or false for all the conditions in the corresponding commit condition correspondingly coincides with the condition information corresponding to all the conditions.

In the processor, a conduction instruction for determining at least one condition among the above conditions preferably has a corresponding commit condition. Each entry in the true/false hold unit deterministically or provisionally holds condition information. The execution control circuit compares a commit condition corresponding to the condition instruction with condition information obtained from the true/false hold unit. The execution control circuit further (i) controls the true/false hold unit to hold deterministically the first or second condition information produced by determination of the selected condition by the operation unit based on the condition instruction in a third case in which true or false for all the conditions in the commit condition corresponding to the condition instruction correspondingly coincides with the condition information. The execution control circuit (ii) further controls the true/false hold unit to provisionally hold the first or second condition information produced by determination of the selected condition by the operation unit based on the condition instruction in a fourth case in which true or false for any condition of the commit condition corresponding to the condition instruction correspondingly coincides with condition information corresponding to that any condition and condition information corresponding to the other conditions in the corresponding commit condition is the third condition information. The processor further includes a second commit control circuit which compares the commit condition corresponding to the condition instruction with the condition information obtained from the true/false hold unit and controls the true/false hold unit to deterministically re-hold the first or second condition information which has been provisionally held by the true/false hold unit, at the time of a commit in which true or false for all the conditions in the commit condition corresponding to the condition instruction coincides with condition information corresponding to all the conditions.

The processor preferably further includes an exception storage circuit, and an exception processing unit. The exception storage circuit scores generation of an exception when the exception occurs during processing the selected instruction and in the second case. The exception processing unit processes an exception when the exception storage circuit has stored occurrence of the exception at the time of the commit.

The processor preferably further includes a true/false calculation circuit, an exception storage circuit, a future true/false hold unit, a reprocessing unit, and an exception processing unit. The true/false calculation circuit adds to condition information obtained from the true/false hold unit condition information produced by determination of the selected condition by the operation unit. The exception storage circuit stores occurrence of an exception when the exception is generated during processing the selected instruction and in the second case. The future true/false hold unit holds condition information obtained from the true/false calculation circuit. The exception processing unit reprocesses all over again instructions already processed by the time of the above commit among the plurality of instructions if the exception storage circuit has stored occurrence of the exception at the time of the commit. The exception processing unit compares a commit condition corresponding to an instruction which has caused the exception with condition information obtained from the future true/false hold unit when the exception is once again generated during reprocessing the instruction by the reprocessing unit, and processes the exception when true or false for all the conditions in the corresponding commit condition correspondingly coincides with condition information corresponding to all the conditions. The true/false hold unit does not accept condition information obtained from the true/false calculation circuit when the reprocessing unit is reprocessing the instruction, and otherwise accept the condition information. The true/false hold unit accepts condition information obtained from the future true/false hold unit when the reprocessing unit completes reprocessing of the instruction.

Therefore, according to the present invention, whether or not a commit condition has already been satisfied is determined before an instruction is executed, and if it is not yet determined whether or not the commit condition is satisfied, the instruction is speculatively executed, and the result data thereof is provisionally held. The provisionally held result data is again held deterministically at the time of a commit. Thus, the instruction unknown of whether or not the commit condition therefor is satisfied can be speculatively executed, and therefore the processing speed of instructions increases.

Preferably, it is determined whether or not a commit condition for an instruction is satisfied before the condition instruction is executed, and the condition instruction is speculatively executed and the condition information is provisionally held even if the commit condition is not yet determined. Therefore, not only usual instructions but also condition instructions can be speculatively executed.

Preferably, if an exception occurs when an instruction is speculatively executed, an exception processing is conducted at the time of a commit. Accordingly, an excess exception processing is not conducted, and the processing speed of instructions further increases.

Preferably, instructions by the time of commit are reprocessed all over again. The future true/false hold unit is referred to when an exception is once again generated, and if an instruction which has caused the exception is to be sequential in the future, the exception processing is conducted. Thus, instruction up to the commit are reprocessed, and the exception processing is conducted as desired if the exception is generated again, and therefore the binary size of programs can be kept from increasing and accurate result data is produced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 19 is a program list showing programs for use in the microprocessor shown in FIG. 18;

FIG. 20 is a representation for use in illustration of the configuration of a register file in a microprocessor according to a fifth embodiment of the invention;

FIG. 24 is a program list showing recovery codes processed by the microprocessor shown in FIG. 21;

FIG. 25 is a program list for calling the recovery codes in the microprocessor shown in FIG. 21;

FIG. 26 is a program list for use in illustrating why rewrite disable means is necessary in an EP circuit in the microprocessor shown in FIG. 21;

DESCRIPTION OF THE PREFERRED EMBODIMENTS

Figure 1:
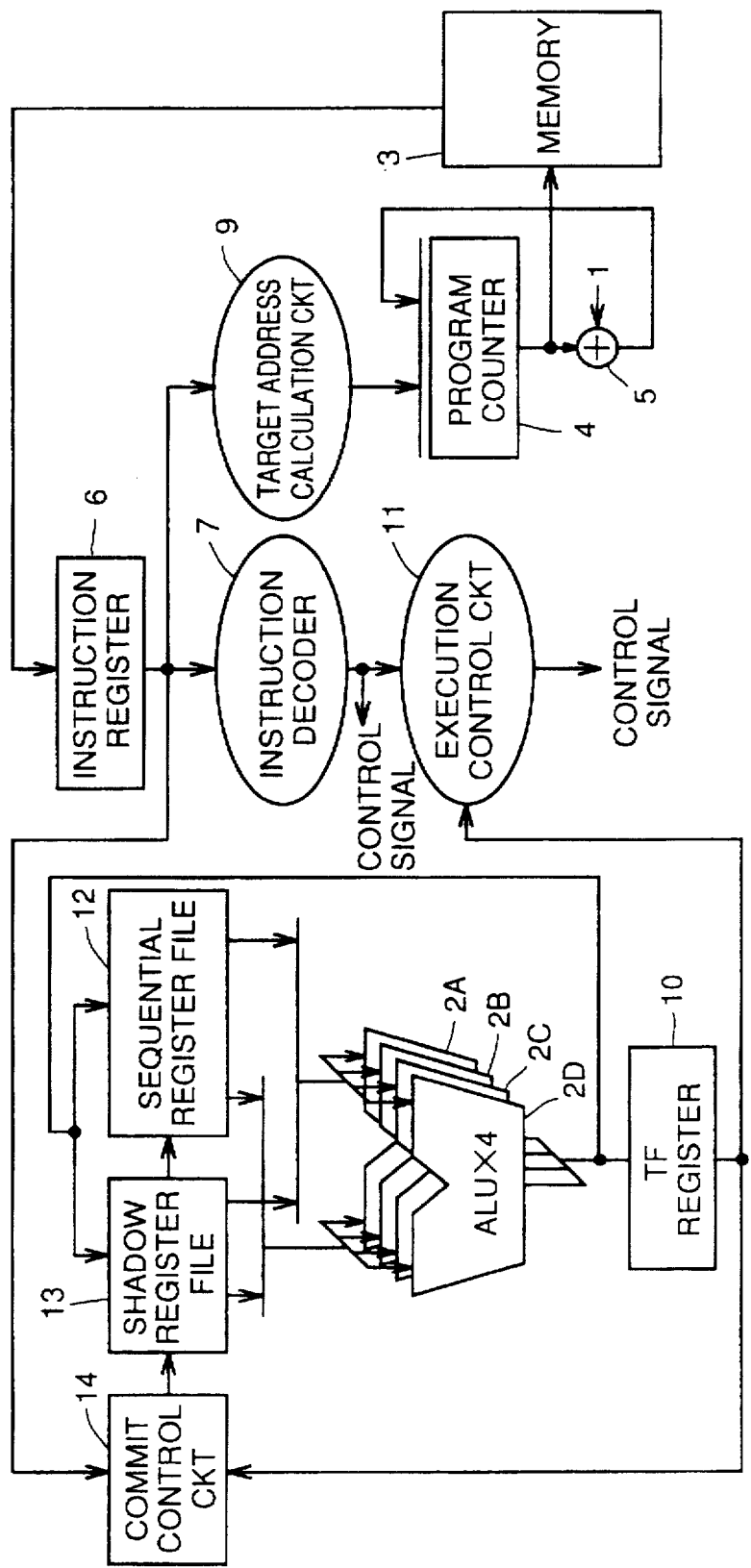
FIG. 1 is a block diagram showing the construction of a microprocessor according to a first embodiment of the present invention.

A method of processing instructions and an apparatus therefor according to the present invention will now be described in detail in conjunction with the accompanying drawings. Note that the same reference characters denote the same or corresponding portions.

[First Embodiment]

FIG. 1 is a block diagram showing the construction of a microprocessor according to a first embodiment of the invention.

Referring to FIG. 1, the microprocessor includes four ALU's 2A to 2D, a memory 3, a program counter d for applying the address of an instruction to be executed to memory 3, a circuit 5 for incrementing program counter 4, an instruction register 6 for holding an instruction fetched from memory 3, an instruction decoder 7 for decoding an instruction held by instruction register 6 and generating a control signal to control ALU's 2A to 2D, and a circuit 9 for calculating a target address.

Figure 28:
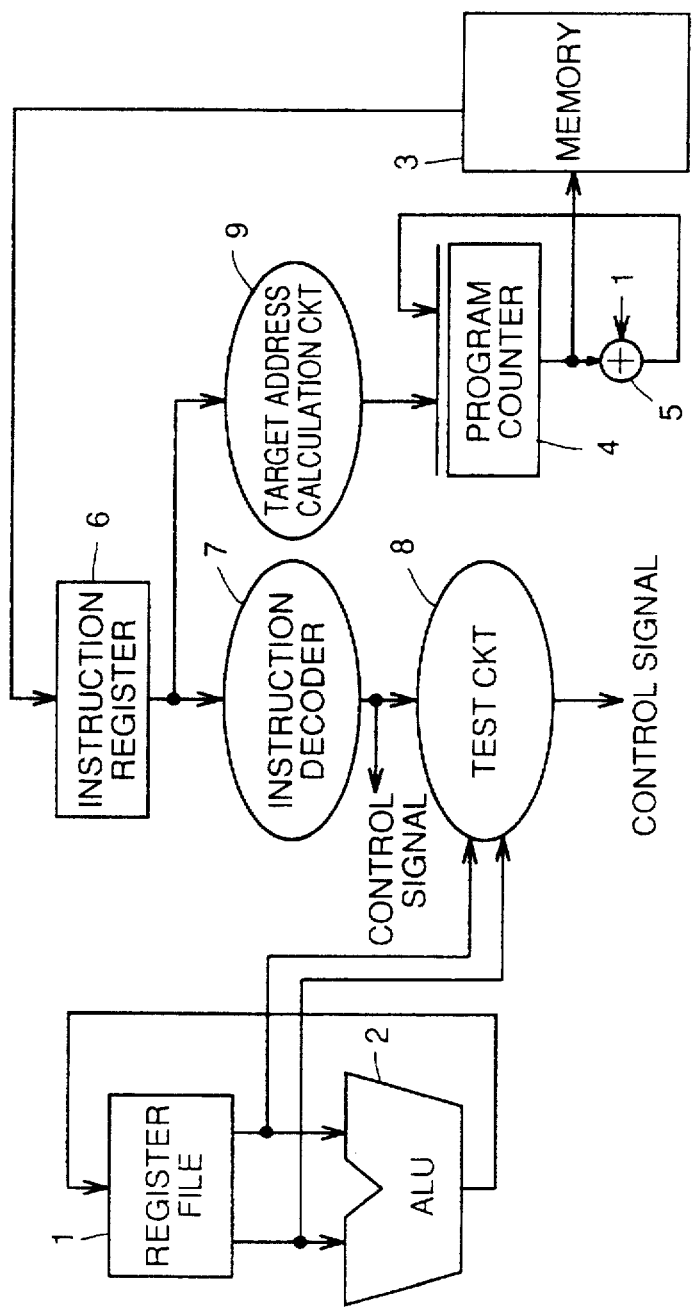
FIG. 28 is a block diagram showing the construction of a conventional microprocessor.

As opposed to the conventional microprocessor shown in FIG. 28, the microprocessor further includes a true/false register (TF register) 10, an execution control circuit 11, a sequential register file 12, a shadow register file 13, and a commit control circuit 14.

Figure 2:
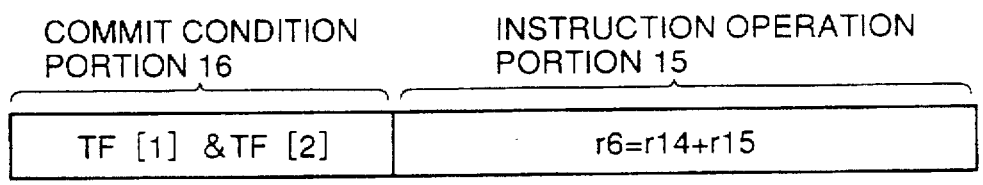
FIG. 2 is a diagram for use in illustration of an example of an instruction code for the microprocessor shown in FIG. 1.

FIG. 2 is a representation showing the configuration of an instruction code which can be processed by the microprocessor. Referring to FIG. 2, the instruction code is formed of an instruction operation portion 15 and a commit condition portion 16. Instruction operation portion 15 responds to an instruction code which can be processed by a conventional microprocessor. Commit condition portion 16 is a portion to specify one or more conditions necessary for executing an instruction indicated in instruction operation portion 15.

Figure 3:
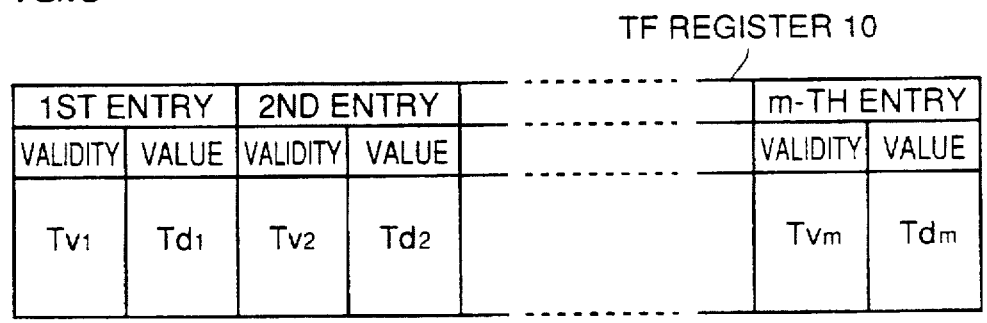
FIG. 3 is a diagram for use in illustration of the configuration of a TF register in the microprocessor shown in FIG. 1.

FIG. 3 is a representation showing the configuration of TF register 10. Referring to FIG. 3, TF register 10 includes m entries. Each entry is formed of 2 bits, validity bit Tv and value Td, and holds first condition information of a certain condition being true, second condition information of the condition being false, or third information of true or false for the condition being undetermined.

TABLE 1

| validity Tv | value Td | meaning |
|---|---|---|
| 1 | 1 | true |
| 1 | 0 | false |
| 0 | X | undetermined |

X: arbitrary value

Referring to Table 1, if validity bit Tv is "1" and value bit Td is "1", the condition is true. Meanwhile, if validity bit Tv is "1" and value bit Td is "0", the condition is false. If validity bit Tv is "0", true or false for the condition is undetermined regardless of the value of value bit Td.

With the instruction code shown in FIG. 2, for example, if a first entry in TF register 10 is "true" and a second entry is also "true", the microprocessor may be instructed to essentially execute adding of a value held by registers r14 and a value held by register r15 and storing the result data in register r6.

Figure 4:
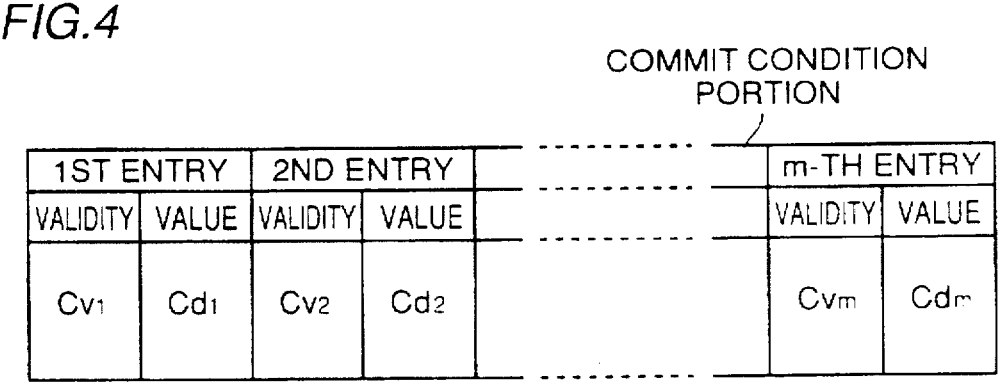
FIG. 4 is a representation for use in illustration of the configuration of a commit condition portion in an instruction code for the microprocessor shown in FIG. 1.

FIG. 4 shows the configuration of commit condition portion 16. Referring to FIG. 4, commit condition portion 16 includes m entries corresponding to the entries in TF register 10. Each entry is formed of 2 bits, validity bit Cv and value bit Cd as is the case with TF register 10.

TABLE 2

| validity Cv | value Cd | meaning |
|---|---|---|
| 1 | 1 | true |
| 1 | 0 | false |
| 0 | X | Don't Care |

X: arbitrary value

Referring to Table 2, if validity bit Cv is "1", and value bit Cd is "1", one necessary condition for an instruction indicated by instruction operation portion 15 to be essentially executed is that a corresponding entry in TF register 10 is "true". Stated differently not the o not the only one condition for the instruction indicated by instruction operation portion 15 to be essentially executed.

If validity bit Cv is "1", and value bit Cd is "0", one necessary condition for an instruction indicated by instruction operation portion 15 to be essentially executed is that a corresponding entry in TF register 10 is "false".

For validity bit Cv of "0", an instruction indicated by instruction operation portion 15 must be always executed regardless of value bit Cd and whether a corresponding entry in TF register 10 is "true", "false" or "undetermined".

Execution control circuit 11 compares an entry in commit control portion 16 and an entry in TF register 10 correspondingly, and controls ALU's 2A to 2D to deterministically execute an instruction or to provisionally execute the instruction in response to the result.

Figure 5:
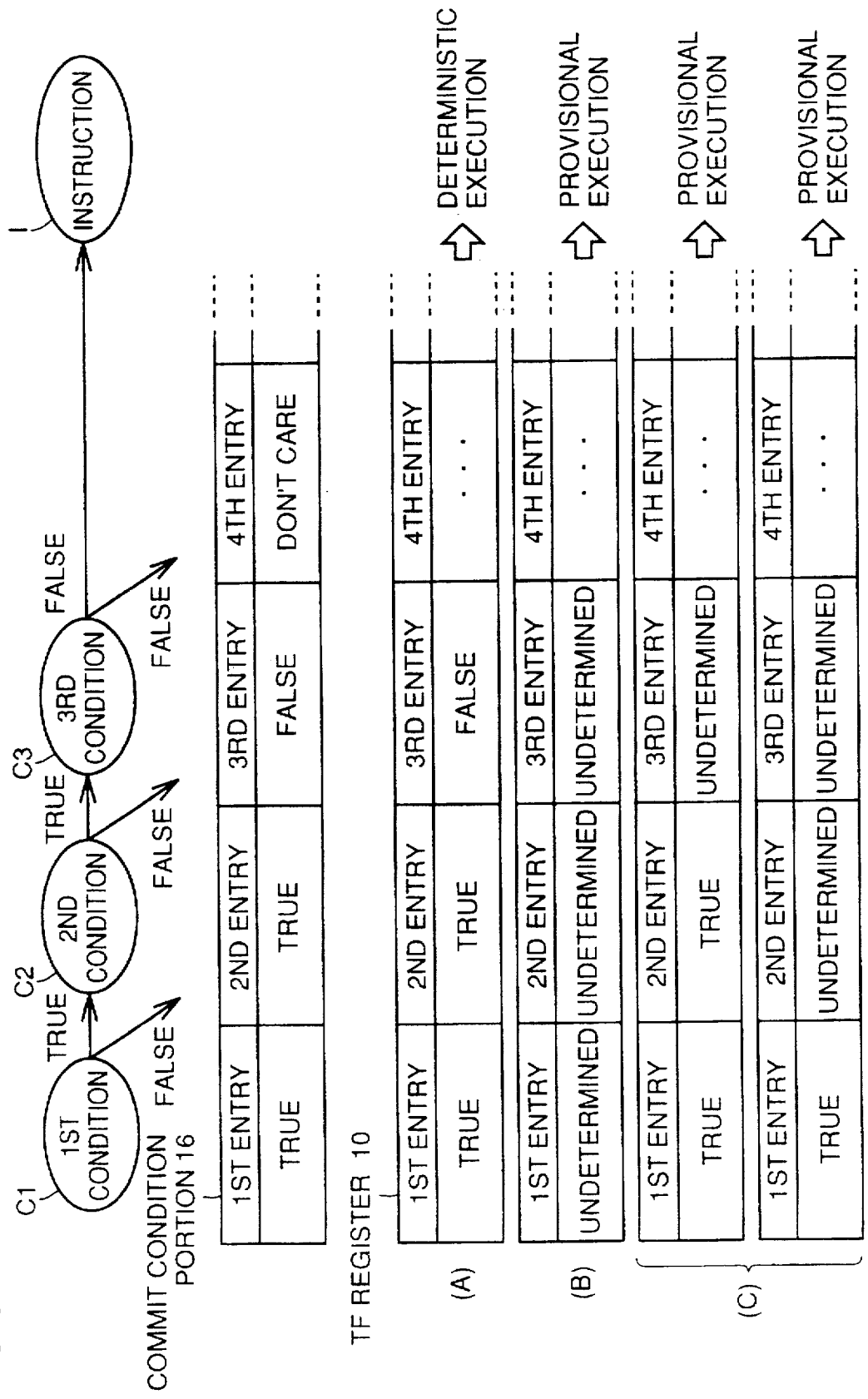
FIG. 5 is a diagram for use in illustration of the concept of the function of an execution control circuit in the microprocessor shown in FIG. 1.

FIG. 5 is a representation for use in detailed illustration of the concept of the function of execution control circuit 11.

Referring to FIG. 5, instruction I is executed under three certain conditions C1 to C3. For example, only when first condition C1 is "true", second condition C2 is "true", and third condition C3 is "false", instruction I is essentially executed, a first entry in commit condition portion 16 holds "true" and a second entry "true", and a third entry "false".

(A) If the first to third entries in TF register 10 corresponding to these conditions C1 to C3 hold "true" or "false" and that "true" and "false" coincides with "true" and "false", for first to third conditions C1 to C3, execution control circuit 11 controls ALU's 2A to 2D to deterministically execute instruction I. Instruction I in this case is particularly called "sequential instruction".

(B) If first to third entries in TF register 10 corresponding to first to third conditions C1 to C3 each hold "undetermined", execution control circuit 11 controls ALU's 2A to 2D to provisionally execute instruction I. Instruction I in this case is sequentially called "speculative instruction".

(C) If some of first to third entries in CF register 10 corresponding to first to third conditions C1 to C3 hold "true" or "false", and the "true" and "false" correspondingly coincide with "true" and "false" for first to third conditions C1 to C3, execution control circuit 11 controls ALU's 2A to 2D to provisionally execute instruction I. Instruction I in this case is also called "speculative instruction".

A sequential register file 12 and a shadow register file 13 are formed of 32 registers 30 and 31, respectively. Sequential register file 12 corresponds to register file 1 in the conventional microprocessor.

Sequential register file 12 deterministically holds result data produced by execution of an instruction by ALU's 2A to 2D. Shadow register file 13 provisionally holds result data produced by execution of an instruction by ALU's 2A to 2D.

Commit control circuit 14 holds the commit condition portion 16 of an instruction corresponding to result data stored in shadow resister 13. Commit control circuit 14 always monitors TF register 10, compares an entry in commit condition portion 16 and an entry in TF register 10, and transfers result data stored in shadow register file 13 to sequential register file 12 if the entries coincide with each other correspondingly.

Referring to FIG. 5, if, for example, speculative instruction I is executed, and the result data is provisionally stored in shadow register file 13, the commit condition portion 16 of instruction I is stored in control circuit 14.

Then, at the point at which first to third entries in TF register 10 corresponding to first to third conditions C1 to C3 necessary for execution of instruction I hold "true" or "false", if the "true" and "false" correspondingly coincide with "true" and "false" for first to third conditions C1 to C3 necessary for execution of instruction I, commit control circuit 14 transfers the result data stored in shadow register file 13 to sequential register file 12.

The configuration of execution control circuit 11, sequential register file 12, shadow register file 13 and commit control circuit 14 will no be described in more detail.

Figure 6:
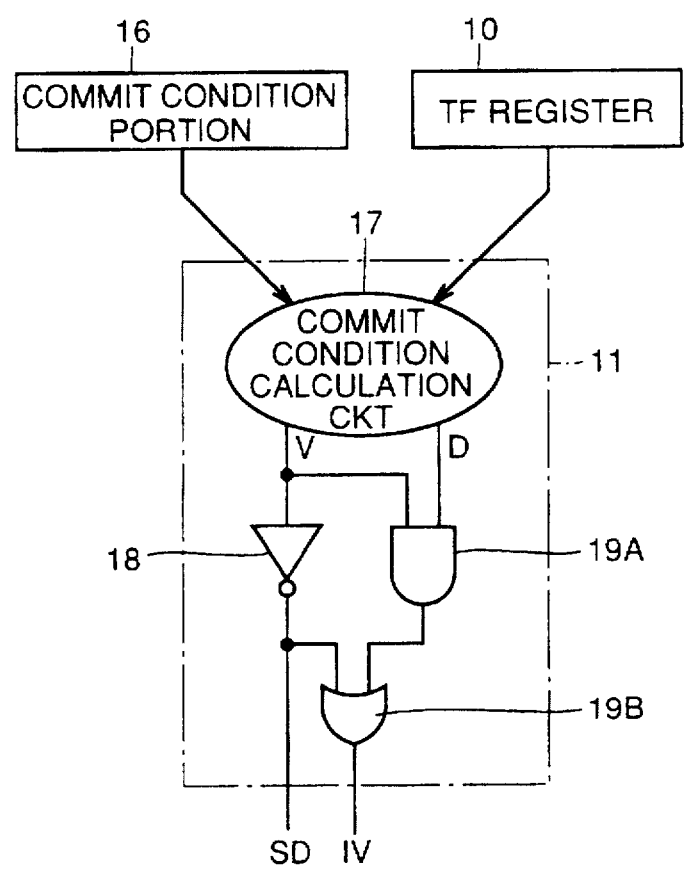
FIG. 6 is a block diagram showing the configuration of the execution control circuit shown in FIG. 1.

FIG. 6 is a block diagram showing the configuration of execution control circuit 11. Referring to FIG. 6, execution control circuit 11 includes a commit condition calculation circuit 17, an invertor 18, an AND gate 19A and an OR gate 19B.

Figure 7:
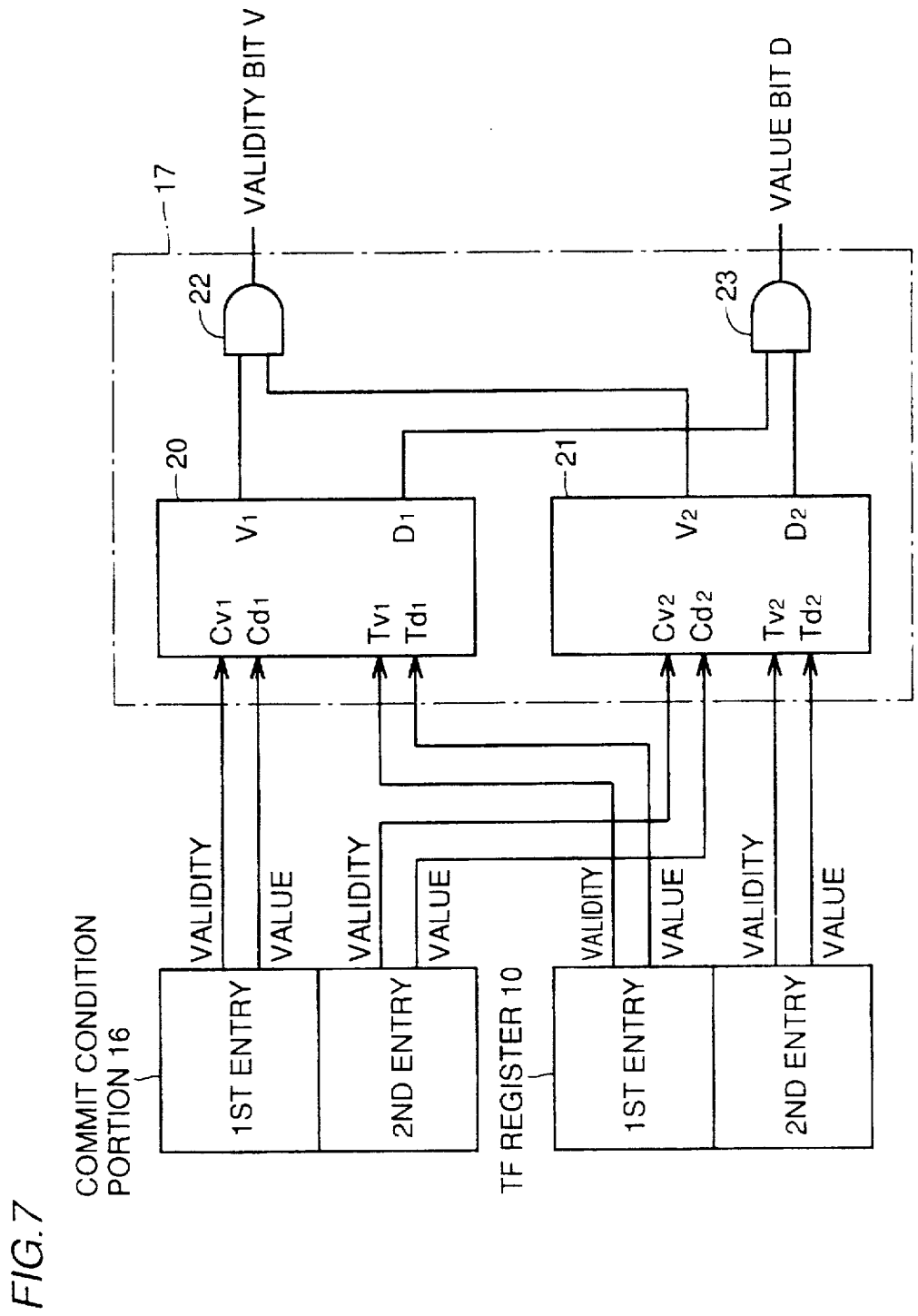
FIG. 7 is a block diagram showing the configuration of a commit condition calculation circuit in the execution control circuit shown in FIG. 6.

FIG. 7 is a block diagram showing the configuration of commit condition calculation circuit 17. Referring to FIG. 7, commit condition calculation circuit 17 includes comparison circuits 20 and 21, and AND gates 22 and 23. In the commit condition calculation circuit shown in FIG. 7, commit condition portion 16 and TF register 10 each have two entries.

Figure 8:
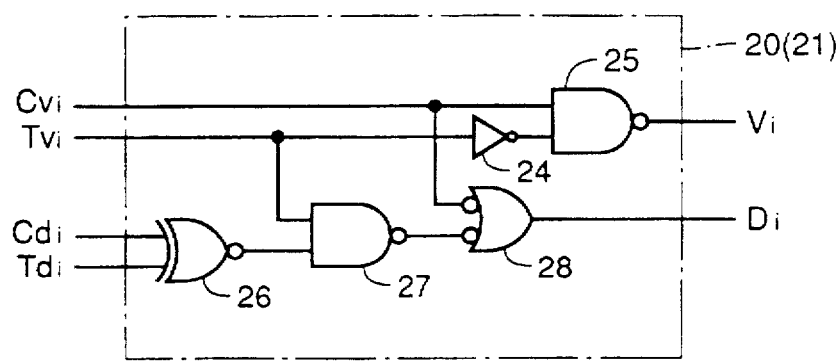
FIG. 8 is a circuit diagram showing the configuration of a comparison circuit in the commit condition calculation circuit shown in FIG. 7.

FIG. 8 is a circuit diagram showing the configuration of comparison circuit 20 or 21 in commit condition calculation circuit 17. Referring to FIG. 8, comparison circuit 20 or 21 includes an invertor 24, an NAND gate 25, an exclusive NOR gate 26, and NAND gates 27 and 28.

Comparison circuits 20 and 21 compare one entry in commit condition portion 16 and a corresponding entry in TF register, and produces validity bit $V_i$ and value $D_i$ depending upon the result.

Table 3 is a truth table showing the operation of comparison circuit 20 or 21.

TABLE 3

| i-th entry in commit condition portion | | i-th entry in TF register | | calculation result for i-th entry | |
|---|---|---|---|---|---|
| Cv | Cd | Tv | Td | validity Vi | value Di |
| 0 | X | X | X | 1 | 1 |
| 1 | X | 0 | X | 0 | X |
| 1 | Cd | 1 | Td | 1 | Cd=Td |

X: arbitrary value

Referring to Table 3, if the validity bit Cv of one entry in the commit condition portion is "0", comparison circuit 20 or 21 produces validity bit $V_i$ of "1" and value bit $D_i$ of "1" regardless of the values of validity bit Tv and value Td.

If the validity bit Cv of one entry in commit condition portion 16 is "1" and the validity bit Tv of a corresponding entry in TF register 10 is "0", comparison circuit 20 or 21 produces validity bit $V_i$ of "0" regardless of the values of value bits Cd and Td of these entries.

If the validity bit Cv of one entry in commit condition portion 16 and the validity bit Tv of a corresponding entry in CF register 10 are both "1", and their value bits Cd and Td are equal to each other, comparison circuit 20 or 21 produces validity bit $V_i$ of "1" and value bit $D_i$ of "1". If value bits Cd and Td of these entries are different, comparison circuit 20 or 21 produces validity bit $V_i$ of "1" and value bit D of "0".

Commit condition calculation circuit 17 produces validity bit $V_i$ of "1" only when the validity bits $V_i$ of both comparison circuits 20 and 21 are "1". Commit condition calculation circuit 17 produces value bit D of "1" only when the value bits $D_i$ of both comparison circuits 20 and 21 are "1".

Therefore, if validity bit V of commit condition calculating circuit 17 is "0", a shadow register write designating bit SD of "1" is produced. The validity bit V and value bit D of commit condition calculation circuit 17 are both "1" or validity bit V is "0", an instruction validity bit IV of "1" is produced.

As can be seen from the above description, if all the entries in commit condition portion 16 holds "don't care" (if a corresponding instruction in the instruction operation portion is to be executed unconditionally), execution control circuit 11 produces shadow register write designation bit SD of "0" and instruction validity bit IV of "1".

Some entries in commit condition portion 16 holds "true" or "false" and corresponding entries in TF registers hold "undetermined", execution control circuit 11 produces shadow register write designation bit SD of "1", and instruction validity bit IV of "1".

If some entries in commit condition portion 16 holds "true" or "false" and some of corresponding entries in TF register 10 hold "true" or "false", and the "true" and "false" in commit condition portion 16 correspondingly coincide with the "true" and "false" in TF register 10, execution control circuit 11 produces shadow register write designation bit SD of "0" and instruction validity bit IV of "1".

For instruction validity bit IV of "1", produced result data is stored in sequential register file 12. If shadow register write designation bit SD is "0" and instruction validity bit IV is "0", an instruction will not be executed or result data produced by execution of the instruction will not be stored in any of sequential register file 12 and shadow register 13. If shadow register write designation bit SD is "1" and instruction validity bit IV is "1", result data produced by execution of an instruction is provisionally stored in shadow register file 13.

Figure 9:
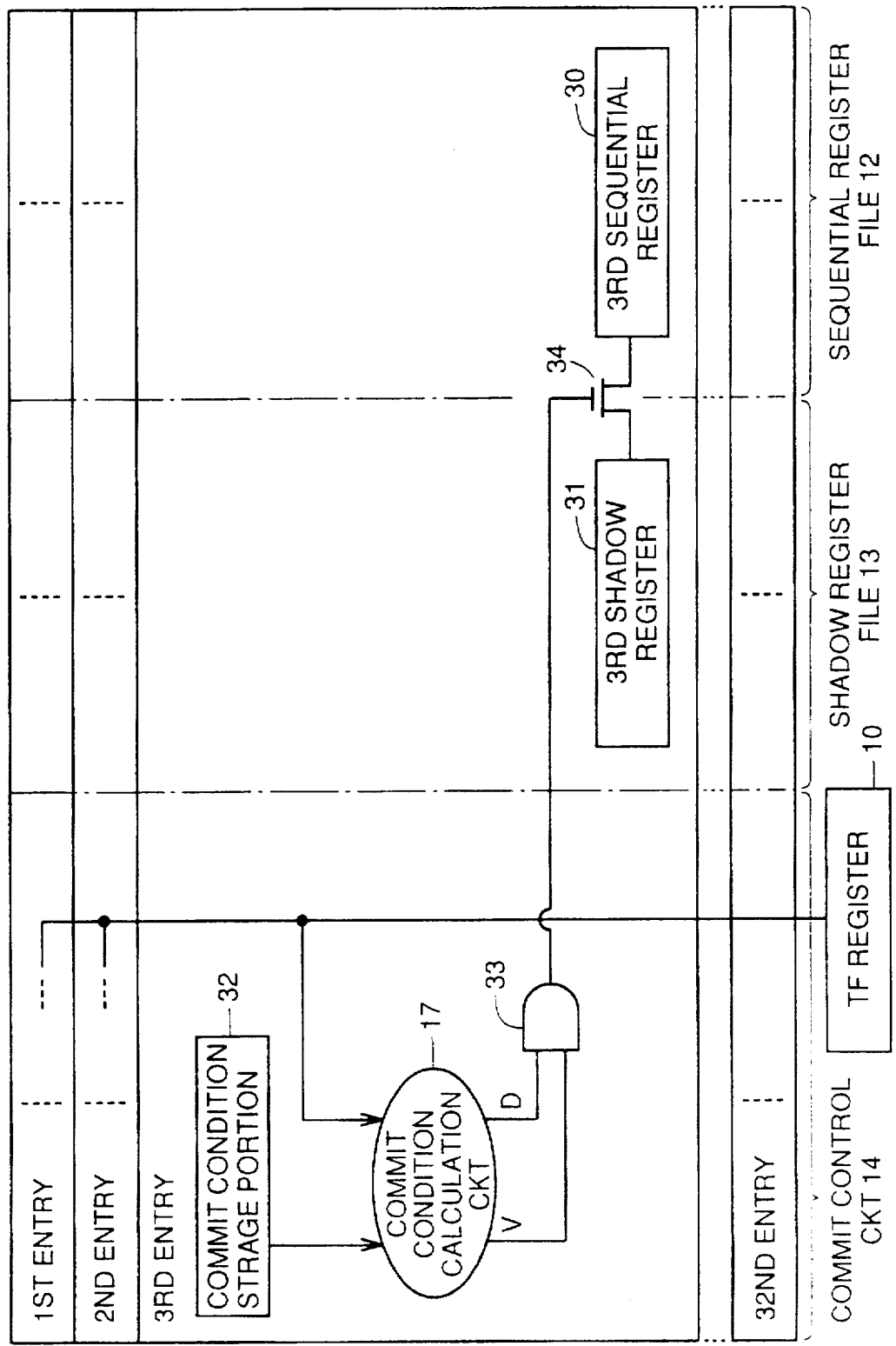
FIG. 9 is a block diagram showing the arrangement of a sequential register file, a shadow register file, and a commit control circuit in the microprocessor shown in FIG. 1.

FIG. 9 is a block diagram showing the configuration of sequential register file 12, shadow register file 13 and commit control circuit 14.

Referring to FIG. 9, sequential register file 12 is formed of 32 sequential registers 30. Shadow register file 13 is formed of 32 shadow registers 31.

Commit control circuit 14 is formed of 32 entries corresponding to 32 sequential registers 30 and 32 shadow registers 31. Each entry includes a commit condition storage portion 32, a commit condition calculation circuit 17 and an AND gate 33.

When a speculative instruction is executed, and the result data is provisionally stored in a shadow register 31 in shadow register file 13, commit condition storage portion 32 holds commit condition portion 16 corresponding to the instruction.

Commit condition calculation circuit 17 which is identical to commit condition calculation circuit 17 in execution control circuit 11 described above compares commit condition portion 16 held by commit condition storage portion 32 and TF register 10, and produces validity bit V and value bit D based on the result. AND gate 33 takes a logical product of the validity bit V and value D of commit condition calculation circuit 17 for application to the gate of a transfer gate 34 connected between sequential register 30 and shadow register 31.

Commit condition calculation circuit 17 always monitors TF register 10, and produces validity bit V of "1" and value bit D of "1" when true/false in commit condition portion 16 held by commit condition storage portion 32 correspondingly coincides with true/false in TF register 10. This turns on transfer gate 34, and result data in shadow register 31 is transferred to sequential register 30.

The operation of the microprocessor according to the first embodiment will now be described based on a program shown in FIG. 10.

Figure 10:
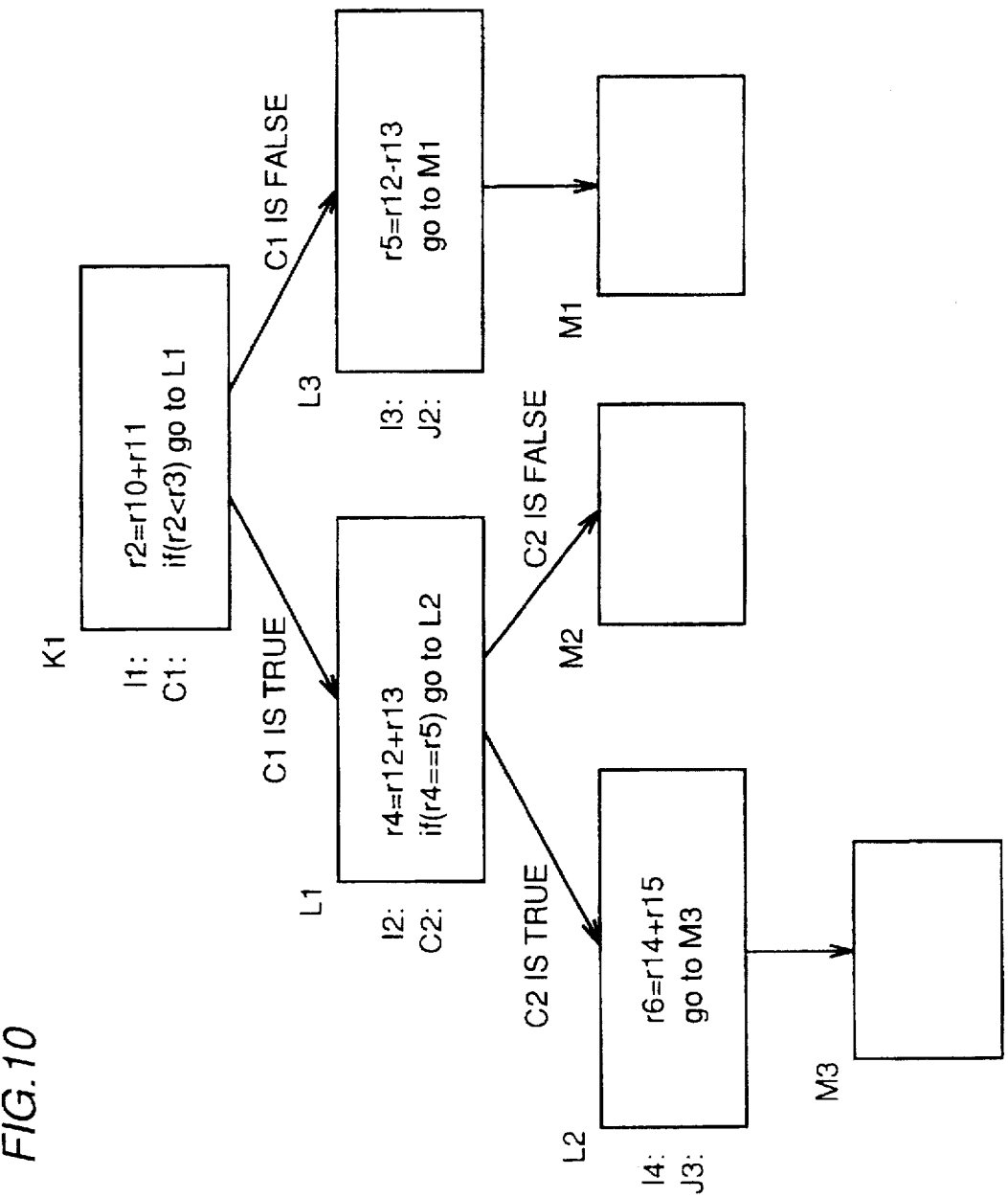
FIG. 10 is a flow chart for use in illustration of an example of a program.
Figure 11:
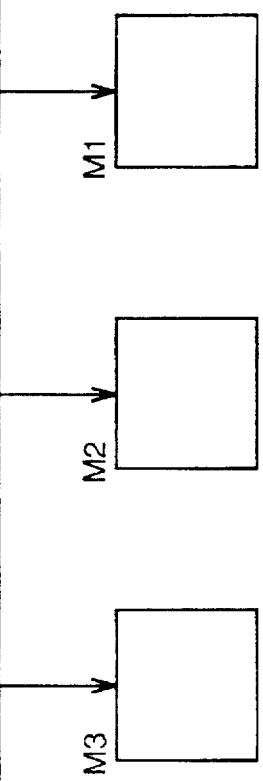
FIG. 11 is a program list showing programs for use in the microprocessor shown in FIG. 1 according to the program showing in FIG. 10.

FIG. 11 is a program list for operating the microprocessor based on the program shown in FIG. 10.

In FIG. 11, each row is formed of a plurality of instruction codes. Each instruction code is formed of an instruction operation portion 15 and a commit condition portion 16. Instructions indicated at the instruction operation portions 15 of the instruction codes in the same row are executed at the time.

Note that the instruction codes are separated from each other by ";". Instruction operation portion 15 and commit condition portion 16 are separated by "?".

"always" in commit condition portion 16 indicates that instructions I1, I2, C1 or C2 in instruction operation portion 15 is always to be executed unconditionally regardless of true/false in TF register 10.

TF[i] indicates that an instruction indicated at instruction operation portion 15 is to be executed only if the i-th entry in TF register 10 is "true". /TF[i] indicates that an instruction at instruction operation portion 15 is to be executed only if the i-th entry in TF register 10 is "false".

TF[1] & TF[2], for example, defines execution of an instruction at the instruction operation portion only when first and second entries in TF register 10 is "true". TF[1] & TF[2] defines that an instruction at instruction operation portion 15 is to be executed only when the first entry in TF register 10 is "true" and the second entry is "false".

Blocks K1, L1 to L3 in FIG. 11 correspond to basic blocks K1, L1 to L3 in FIG. 10. Blocks K1, L1 to L3 branch into basic blocks M1 to M3.

In the first cycle, four instructions I1 to I4 in the first row are executed at a time.

With instruction code "always?I1", instruction I1 is executed unconditionally. More specifically, all the entries in the commit condition portions 16 of the instruction codes are "don't care" and the validity bit Cv of each entry is "0".

Commit condition calculation circuit 17 therefore produces validity bit V and value bit D both of "1" irrespective of the validity bits Tv and Td of each entry in TF register 10. Thus, execution control circuit 11 produces shadow write designation bit SD of "0" and instruction validity bit IV of "1".

Accordingly, the data of registers r10 and r11 in sequential register file 12 are added, and the result data is deterministically stored in register r2 in sequential register file 12.

With instruction code "TF[1]?I2", the first entry in commit condition portion 16 of the instruction code is "true" and validity bit Cv and value bit Cd are both "1". Validity bits CV other than that of the first entry in commit condition portion 16 are all "0".

Since at this point, the first entry in TF register 10 is "undetermined" and validity bit Tv is "0", execution control circuit 11 produces shadow register write designation bit SD of "1" and instruction validity bit IV of "0". The data of registers r12 and r13 in sequential register file 12 are added, and the result data is provisionally stored in register r4 in shadow register file 13.

At the time, the data of commit condition portion 16 held by instruction register 6 is stored in the commit condition storage portion 32 of the fourth entry in commit control circuit 14 corresponding to shadow register r4 which stores the result data.

With instruction code "/TF[1]?I3", the first entry in the commit condition portion 16 of the instruction code is "false", and validity bit Cv is "1". Since the first entry in TF register 10 is "undetermined" as described above, the data of register r13 is subtracted from the data of register r12 in sequential register file 12 according to instruction I3 and the result data is provisionally stored in shadow register r5 in shadow register file 13.

At the time, the data of commit condition portion 16 is also stored in the commit condition storage portion 32 of the fifth entry in commit control circuit 14 corresponding shadow register r5 which stores the result data.

With instruction code "TF[1]&TF[2]?I4", the first and second entries in the commit condition portion 16 of the instruction code are both "true". At the time, since the first and second entries in TF register 10 are "undetermined", the data of registers r14 and r15 in sequential register file 12 are added according to instruction I4 and the result data is provisionally stored in register r6 in shadow register file 13.

At the time, the data of commit condition portion 16 is also stored in the commit condition storage portion 32 of the sixth entry in commit control circuit 14.

In the next cycle, condition instruction C1 is always executed according to instruction code "always?C1". More specifically, if the data of register r2 is smaller than the data of register r3, the first entry in TF register 10 is made "true", or otherwise "false".

According to instruction code "always?C2", if the data of registers r4 and r5 are equal to each other, the second entry in TF register 10 is made "true", or otherwise "false".

At the time, commit control circuit 1A monitors TF register 10, and compares commit condition portion 16 stored in commit condition storage portion 32 and TF register 10.

If the first entry in TF register 10 is "true" the commit condition calculation circuit 17 of the fourth entry in commit control portion 14 produces validity bit V and value bit D both of "1". The logical product of validity bit V and value bit D is applied to the gate of transfer gate 34 by AND gate 33, and transfer gate 34 is turned on. The data of register r4 in shadow register file 13 is thus transferred to corresponding register r4 in sequential register file 12.

At the time, the data of register r5 in shadow register file 13 is subjected to no processing. Meanwhile, if the first entry in TF register 10 is "false", the data of register r5 in shadow register file 13 is transferred to corresponding register r5 in sequential register file 12 through transfer gate 34.

At the time, the data of register r4 in shadow register file 13 is not subjected to any processing.

If the first and second entries in TF register 10 are both "true" the data of register r6 in shadow register file 13 is transferred to corresponding register r6 in sequential register file 12 through transfer gate 34.

If at least one of the first and second entries in TF register 10 is "false", however, the data of register r6 in shadow register file 13 is not subjected to any processing.

Next in the third cycle, according to instruction code "TF[1]&/TF[2]?J1", if the first entry in TF register 10 is "true", and the second entry is "false", an unconditional branch instruction J1 is executed. More specifically, if condition C1 is "true" and condition C2 is "false", an address designating basic block M2 is stored in program counter 4.

If the first entry in TF register 10 is "false", an unconditional branch instruction J2 is executed. More specifically, if condition C1 is false", an address designating basic block M1 is stored in program counter 4.

If the first and second entries are both "true" in TF register 10, an unconditional branch instruction J3 is executed. More specifically, if conditions C1 and C2 are both "true", an address designating basic block M3 is stored in program counter 4.

As described above, according to the first embodiment, an instruction to be essentially executed under one or more conditions is executed before the true/false of the conditions are determined. According to the program shown in FIG. 11, for example, instruction I2 which is supposed to be executed under condition C1 is speculatively executed in the first cycle before the true/false of condition C1 is determined. Instruction I3 which is also supposed to be executed under condition C1 is speculatively executed in the first cycle before the true/false of condition C1 is determined. Instruction I4 which is supposed to be executed under conditions C1 and C2 is speculatively executed in the first cycle before the true/false of these conditions C1 and C2 are determined.

Therefore, such speculative instructions I2 through I4 which cannot be executed in the first cycle with the conventional microprocessor are executed, and ALU's 2A to 2D are effectively used. This improves the processing speed of instructions.

Note that in the first embodiment sequential register file 12 and shadow register file correspond to the data hold unit which deterministically or provisionally holds result data.

[Second Embodiment]

Figure 12A:
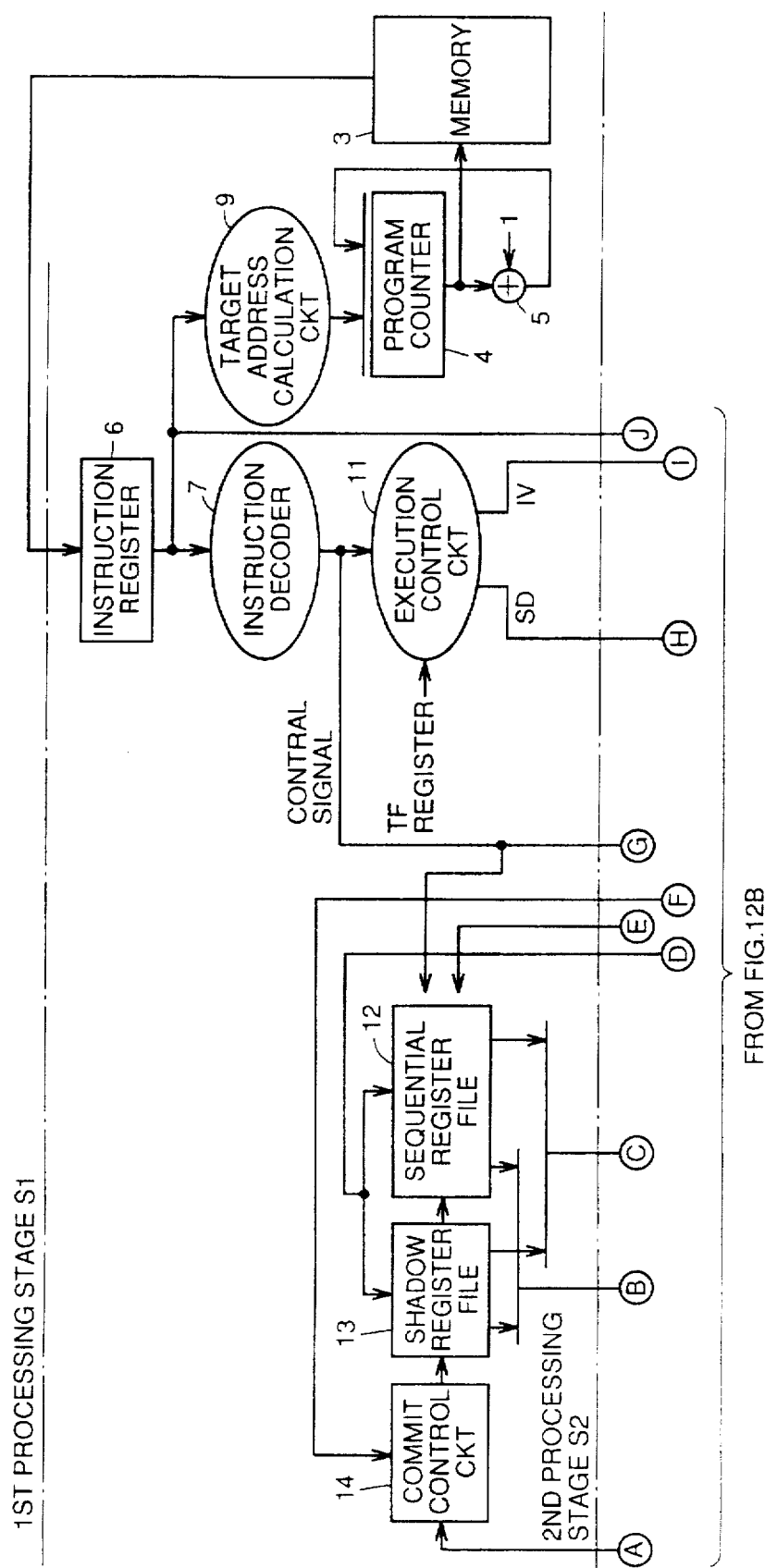
FIGS. 12A and 12B are block diagrams together showing the construction of a microprocessor according to a second embodiment of the invention.
Figure 12B:
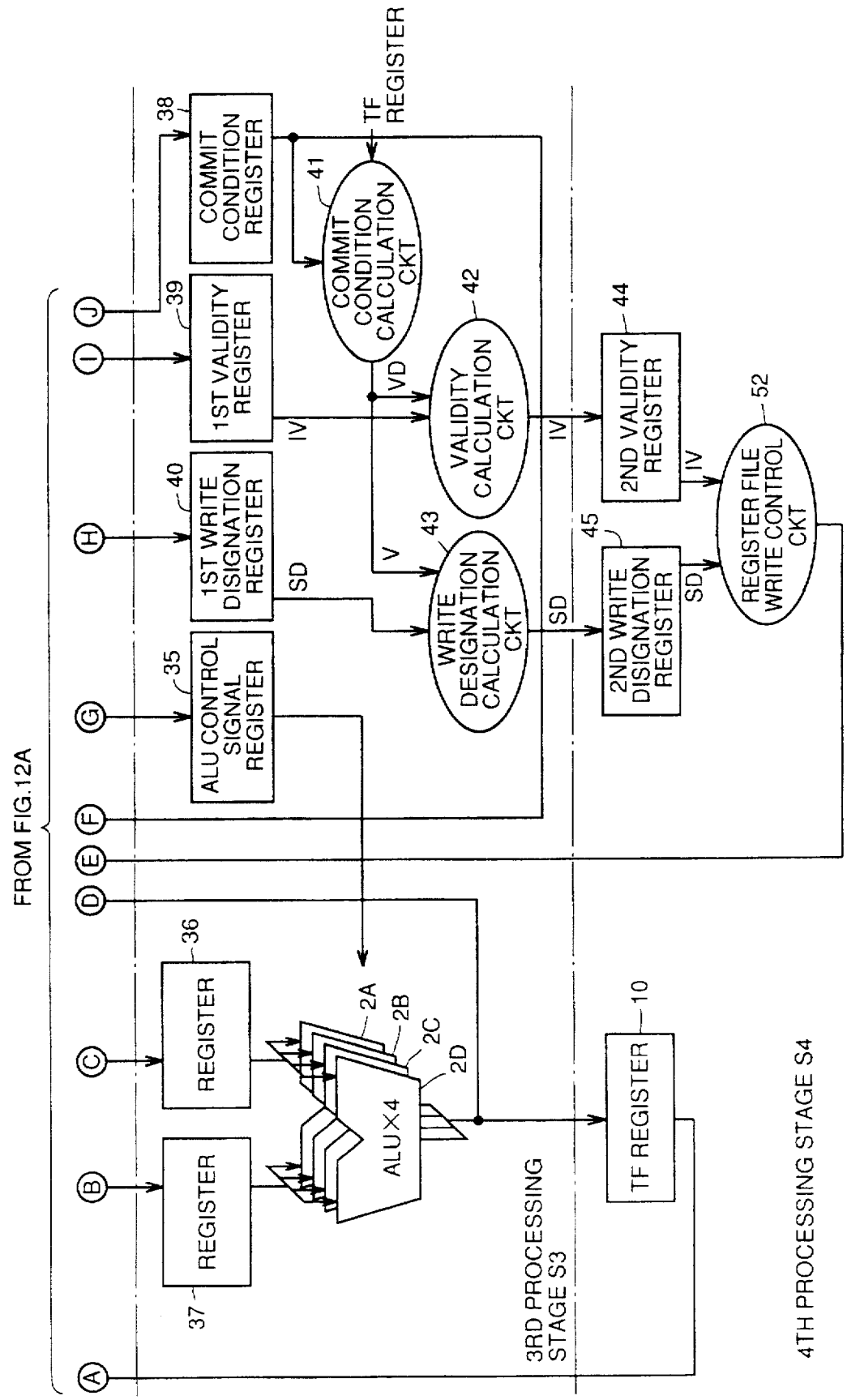

FIGS. 12A and 12B are block diagrams showing the configuration of a microprocessor according to a second embodiment of the invention. The microprocessor according to the second embodiment is a pipeline arrangement of microprocessors according to the first embodiment.

Referring to FIGS. 12A and 12B, the microprocessor essentially processes a plurality of instructions to be executed under one or more conditions through four processing stages S1 to S4.

As is the case with the microprocessor according to the first embodiment, the microprocessor includes four ALU's 2A to 2D, a memory 3, a program counter 4, an increment circuit 5, an instruction register 6, an instruction decoder 7, a target address calculation circuit 9, a TF register 10, an execution control circuit 11, a sequential register file 12, a shadow register file 13, and a commit control circuit 14.

Figure 13:
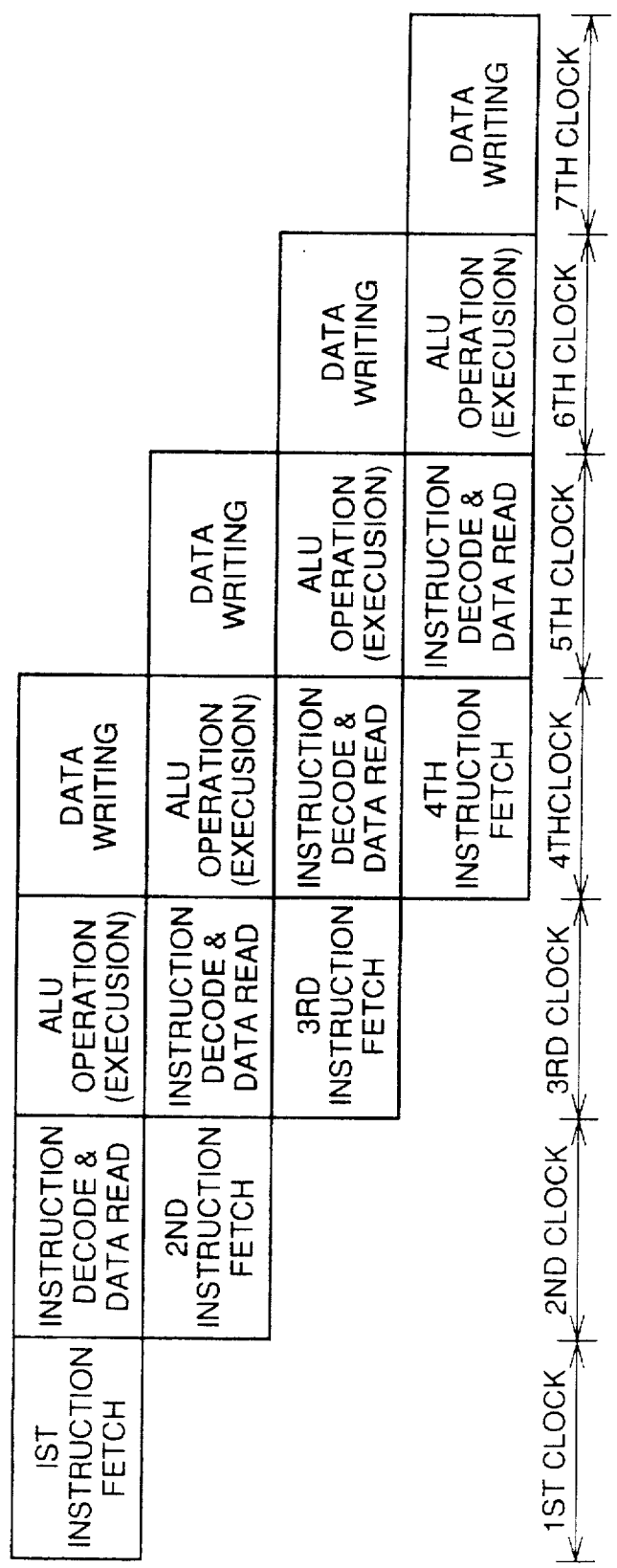
FIG. 13 is a timing chart for use in illustration of the operation of the microprocessor shown in FIGS. 12A and 12B.

FIG. 13 is a timing chart for use in illustration of operations with the microprocessor.

Referring to FIGS. 12 and 13, in the first processing stage S1, an instruction designated by program counter 4 is fetched from memory 3 and stored in instruction register 6.

In the second processing stage S2, the instruction stored in instruction register 6 is decoded by instruction decoder 7, and prescribed data is read out from sequential register file 12 or shadow register file 13 in response to a control signal from instruction decoder 7.

The microprocessor further includes a register 35 for storing signals produced by instruction decoder 7 for controlling ALU's 2A to 2D, and registers 36 and 37 for storing data read out from sequential register file 12 or shadow register file 13.

In the third processing stage S3, data stored in registers 36 and 37 are operated by ALU's 2A to 2D in response to a control signal stored in ALU control signal register 35.

In the fourth processing stage S4, the result data produced by ALU's 2A and 2D are written in sequential register file 12 or shadow register file 13, or true or false condition information produced by ALU's 2A to 2D is written in TF register 10, and data in commit condition portion 16 is written in commit control circuit 14.

A description follows on unique configuration of the microprocessor which processes instruction with commit conditions under pipeline control.

Referring to FIGS. 12A and 12B, the microprocessor further includes an execution control circuit 11, a commit condition register 38, a first validity register 39, and a first write designation register 40.

Execution control circuit 11 is identical to that in the first embodiment, compares commit condition portion 16 and TF register 10, and produces instruction validity bit IV and shadow register write designation bit SD based on the result.

Commit condition register 38 holds commit condition portion 16 corresponding to an instruction being executed in ALU's 2A to 2D. First validity register 39 holds instruction validity bit IV produced by execution control circuit 11 and corresponding to the instruction. First write designation register 40 holds shadow register write designation bit SD produced by execution control circuit 11 and corresponding to the instruction. The microprocessor further includes a commit condition calculation circuit 41, a validity calculation circuit 42, a write designation calculation circuit 43, a second validity register 44, and a second write designation register 45.

Commit condition calculation circuit 41 is identical to commit condition calculation circuit 17 shown in FIG. 7, compares commit condition portion 16 stored in commit condition register 38 and TF register 10, and produces validity bit V and value bit D based on the result.

Figure 14:
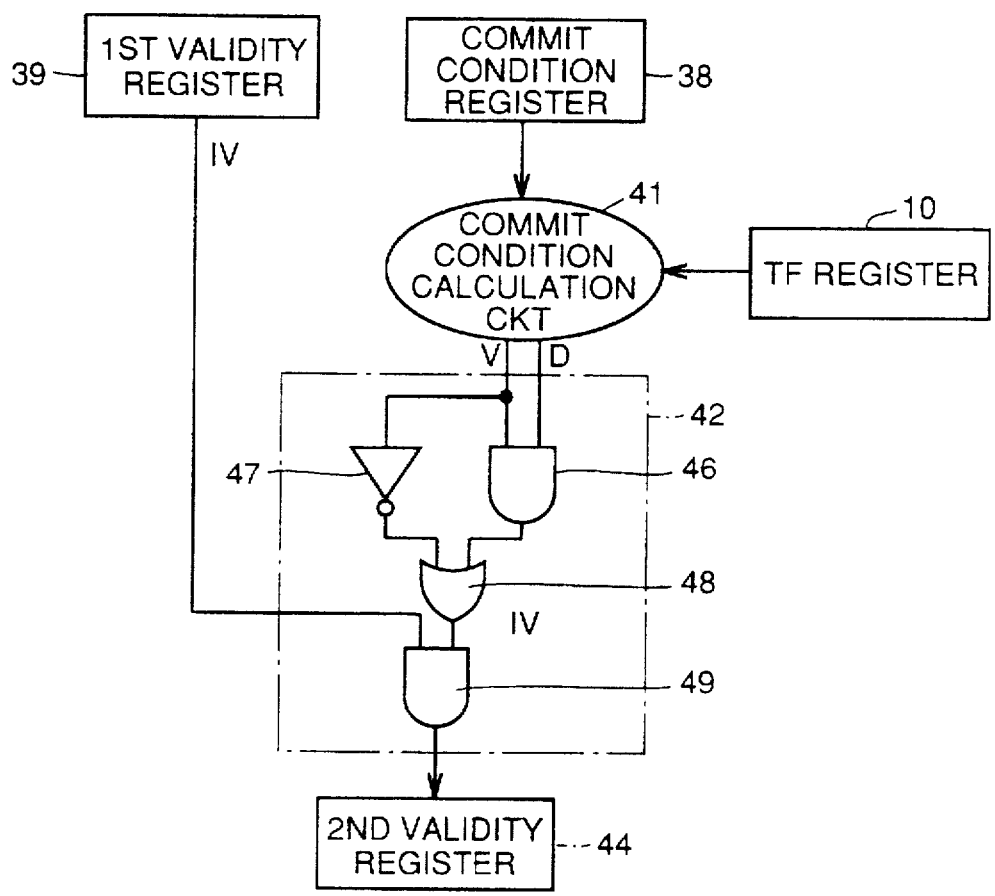
FIG. 14 is a block diagram showing the configuration of a validity calculation circuit in the microprocessor shown in FIGS. 12A and 12B.

FIG. 14 is a block diagram showing the configuration of validity calculation circuit 42. Referring to FIG. 14, validity calculation circuit 42 includes an AND gate 46 receiving validity bit V and value bit D from commit condition calculation circuit 41, an OR gate 48 receiving the output of AND gate 46 and its validity bit V through invertor 47, and an AND gate 49 receiving the output of OR gate 48 and instruction validity bit IV from first validity register 39.

The following Table 4 sets forth the function of validity calculation circuit 42.

TABLE 4

| commit condition calculation result | | | processing of instruction |
|---|---|---|---|
| V | D | meaning | validity bit |
| 1 | 1 | commit condition satisfied | to the next processing stage with value unaltered |
| 1 | 0 | commit condition not satisfied | set to "0" |
| 0 | X | whether or not commit condition is satisfied unknown | to the next processing stage with value unaltered |

Referring to FIG. Table 4, when commit condition calculation circuit 41 produces validity bit v and value D both of "1", the output of OR gate 48 is "1", and therefore instruction validity bit IV stored in first validity register 39 Is transferred lo second validity register 44 through AND gate 49.

Commit condition calculation circuit 41 produces validity bit V of "1" and value bit D of "0", the output of OR gate 48 is "0", instruction validity bit IV of "0" is stored in second validity register 44.

When commit condition calculation circuit 41 produces validity bit V of "0", the output of OR gate 48 is "1", instruction validity bit IV stored in first validity register 39 is transferred to second validity register 4A through AND gate 49.

Figures 15, 16:
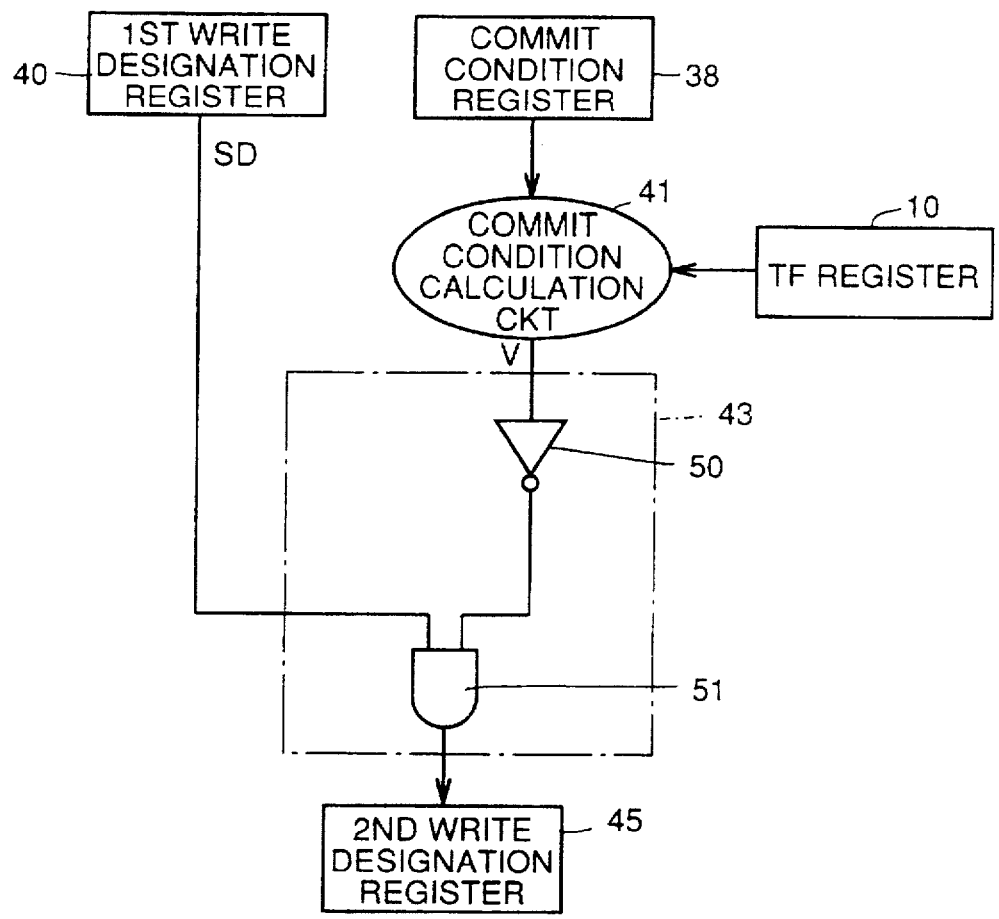
FIG. 15 is a block diagram showing the configuration of a write designation calculation circuit in the microprocessor shown in FIGS. 12A and 12B.
FIG. 16 is a program list showing programs for use in the microprocessor according to a third embodiment of the invention.

FIG. 15 is a block diagram showing the configuration of write designation calculation circuit 43. Referring to FIG. 15, write designation calculation circuit 43 includes an invertor 50 receiving validity bit V from commit condition calculation circuit 41, and an AND gate receiving the output of invertor 50 and shadow register write designation bit SD from write designation register The following Table 5 sets forth the function of write designation calculation circuit 43.

TABLE 5

| commit condition calculation result | | processing of shadow register |
|---|---|---|
| V | meaning | writing designation bit |
| 1 | whether or not commit condition is satisfied determined | set to "0" |

TABLE 5-continued

| commit condition calculation result | | processing of shadow register |
|---|---|---|
| V | meaning | writing designation bit |
| 0 | whether or not commit condition is satisfied undetermined | to the next processing stage with value unaltered |

Referring to Table 5, when commit condition calculation circuit 41 produces validity bit V of "1", the output of invertor 50 is "0", and therefore shadow register write designation bit SD of "0" is stored in second write designation register 45.

When commit condition calculation circuit 41 produces validity bit V of "0", the output of invertor 50 is "1", and therefore shadow register write designation bit SD stored in first write designation register 40 is transferred to second write designation register 45 through AND gate 51.

The microprocessor further includes a register file write control circuit 52. Register file write control circuit 52 makes such a control that when instruction validity bit IV stored in second validity register 44 is "1" and shadow register write designation bit SD stored in second write designation register 15 is "0", result data produced by ALU's 2A to 2D according to the instruction is written in sequential register file 12.

When instruction validity bit IV in second validity register 44 is "1", and shadow register write designation bit SD stored in second write designation register 15 is "1", register file write control circuit 52 makes such a control that result data which ALU's 2A to 2d has produced according to the instruction is written in shadow register file 13.

When instruction validity bit IV stored in second validity register 44 is "0", register file write control circuit 52 makes such a control that result data which ALU's 2A to 2D has produced according to the instruction is not written in any of sequential register file 12 and shadow register file 13.

The operation of the microprocessor according to second embodiment will now be described in conjunction with FIGS. 12 and 13.

In the first clock, the first instruction is fetched from memory 3 in first processing stage S1 and stored in instruction register 6.

Then in the second clock, the first instruction stored in instruction register 6 is decoded by instruction decoder 7 in second processing state S2, and data in sequential register file 12 or shadow register file 13 is read out in response to a control signal from instruction decoder 7, and stored in register 36 or 37. Execution control circuit 11 in second processing stage S2 produces instruction validity bit IV and shadow register write designation bit SD corresponding to the first instruction, and the produced data are stored in first validity register 39 and first write designation register 40, respectively.

More specifically, if the true/false of entries in commit condition portion 16 correspondingly coincide with the true/false of entries in TF register 10, execution control circuit 11 produces during moving to third processing stage S3 handling information defining that result data to be produced later according to the first instruction will be stored in sequential register file 12.

If the true/false of the entries in commit condition portion 16 do not correspondingly coincide with the true/false or entries in TF register 10, execution control circuit 11 produces during moving to third processing stage S3 handling information which defines that result data to be produced later according to the first instruction will not be stored in any of sequential register file 12 and shadow register file 13.

At the same time, the second instruction is fetched from memory 3 in first processing stage S1 and stored in instruction register 6.

Then, in the third clock, in response to a control signal stored in ALU control signal register 35, ALU's 2A to 2D in third processing stage S3 executes the first instruction. Commit condition calculation circuit 41 in third processing stage S3 compares commit condition portion 16 corresponding to the first instruction stored in commit condition register 38 with TF register 10, and produces validity bit V and value bit D for the first instruction.

Validity calculation circuit 42 in third processing stage S3 transfers instruction validity bit IV stored in first validity register 39 to second validity register 44 without any change or changes instruction validity bit IV based on validity bit V and value bit D from commit condition calculation circuit 41.

Write designation calculation circuit 43 based on validity bit V from commit condition calculation circuit 41, transfers shadow register write designation bit SD stored in first write designation register 40 to second write designation register 45 without any change or changes shadow register write designation bit SD.

When instruction validity bit IV of "1" is stored in first validity register 39 and shadow register write designation bit SD of "0" is stored in first write designation register 40 (if it has already been determined that the first instruction is valid and the result data is to be written in sequential register file 12), commit condition calculation circuit 41 always produces validity bit V and value bit D both of "1", and therefore, instruction validity bit IV of "1" is stored in second validity register 44 and shadow register write designation bit SD of "0" remains to be "0". As a result, shadow register write designation bit SD is stored in second write designation register 45 without any change.

When instruction validity bit IV of "0" is stored in first validity register 39 and shadow register write designation bit SD of "0" is stored in first write designation register 40 (if the first instruction has already been determined invalid), commit condition calculation circuit 41 always produces validity bit V of "1" and value bit D of "3", therefore instruction validity bit IV of "0" and shadow register write designation bit SD of "0" are both made into "0". As a result, instruction validity bit IV and shadow register write designation bit SD are both stored in second validity register 44 and second write designation register 45 without any change.

When instruction validity bit IV of "1" is stored in validity register 39 and shadow register write designation bit DS of "1" is stored in first write designation register 40 (if result data to be produced according to the first instruction is to be stored in shadow register file 13), in third processing stage S3, any of determinations that the commit condition corresponding to the first instruction is satisfied, that the commit condition is not satisfied, and that it is undetermined whether or not the commit condition is satisfied can be made.

If the commit condition is determined to be satisfied (if commit condition calculation circuit 41 produces validity bit V and value bit D both of "1"), instruction validity bit IV is stored in second validity register 44 without any change, shadow register write designation bit SD of "1" is changed to "0" and stored in second write designation register 45.

If the commit condition is determined to be not satisfied (if commit condition calculation circuit al produces validity bit V of "1" and value bit D of "0") instruction validity bit IV and shadow register write designation bit SD of "1" are both changed to "0", and stored in second validity register 44 and second write designation register 45, respectively.

If it is not determined whether or not the commit condition is satisfied (if commit condition calculation circuit 41 produces validity bit V of "0") instruction validity bit IV and shadow register write designation bit SD both of "1" are stored as they are in second validity register 44 and second write designation register 45, respectively.

Simultaneously with this, second instruction fetched by instruction register 6 is decoded by instruction decoder 7, and data in sequential register file 12 or shadow register file 13 is read out in response to a control signal from instruction decoder 7.

Further simultaneously with this, the third instruction is fetched from memory 3.

Then, in the fourth clock, the result data produced by ALU's 2A to 2D according to the first instruction is written in sequential register file 12 or shadow register file 13 in response to a control signal from register file write control circuit 52. More specifically, when instruction validity bit IV is "1" and shadow register write designation bit SD is "0", register file write control circuit 52 makes such a control that the result data is written in sequential register file 12.

When instruction validity bit IV is "1" and shadow register write designation bit SD is "1", register file write control circuit 52 makes such a control that the result data is written in shadow register file 13.

For instruction validity bit IV of "0", register write control circuit 52 makes such a control that the result data will not be written in any of sequential register file 12 and shadow register file 13.

Note that if the result data is written in shadow register file 13, commit condition portion 16 corresponding to the first instruction is stored in commit condition storage portion 32 in commit control circuit 14.

Simultaneously with this, the second instruction is executed by ALU's 2A and 2D, and instruction validity bit IV and shadow register write designation bit SD are stored in second validity register 44 and second write designation register 45, respectively.

Simultaneously with this, the third instruction is decoded by instruction decoder 7, and data in sequential register file 12 or shadow register file 13 is read out in response to a control signal from instruction decoder 7.

Further simultaneously with this, the fourth instruction is fetched from memory 3. Hereinafter, the second to fourth instructions are processed similarly to the case or the first instruction.

[Third Embodiment]

The microprocessor according to the first embodiment is capable of executing condition instruction C2 before executing condition instruction C1 based on the program shown in FIG. 10, for example. In terms of the program, however, condition instruction C2 is supposed to be executed after condition instruction C1 is executed.

According to the meaning of the program, the microprocessor may be configured such that condition instruction C2 cannot be executed until condition instruction C1 is executed.

FIG. 16 is a program list showing an example of program for a microprocessor according to a third embodiment of the invention. Note that instructions I1 to I4, C1 and C2, D1 and D3 are identical to those shown in FIG. 11.

What is characteristic is that condition instruction C2 is executed depending upon a result of execution of condition instruction C1. More specifically, condition instruction C2 is executed only when the first entry in TF register 10 is "true". The true/false of the first entry in TF register 10 is determined by execution of condition instruction C1 in the immediately previous cycle.

Accordingly, condition instruction C2 is executed only when condition instruction C1 is executed-ed and the first entry in TF register 10 is written with "true", and this allows "true" or "false" to be written in the second entry TF register 10.

Stated differently, the second entry in the first embodiment only includes the result of execution of condition instruction C2, while the second entry according to the third embodiment includes not only the execution result of condition instruction C2 but also implicitly includes the fact that the first entry is "true".

The condition of "TF[0]&TF[02" according to the first embodiment is simply represented as "TF2]".

Figure 17:
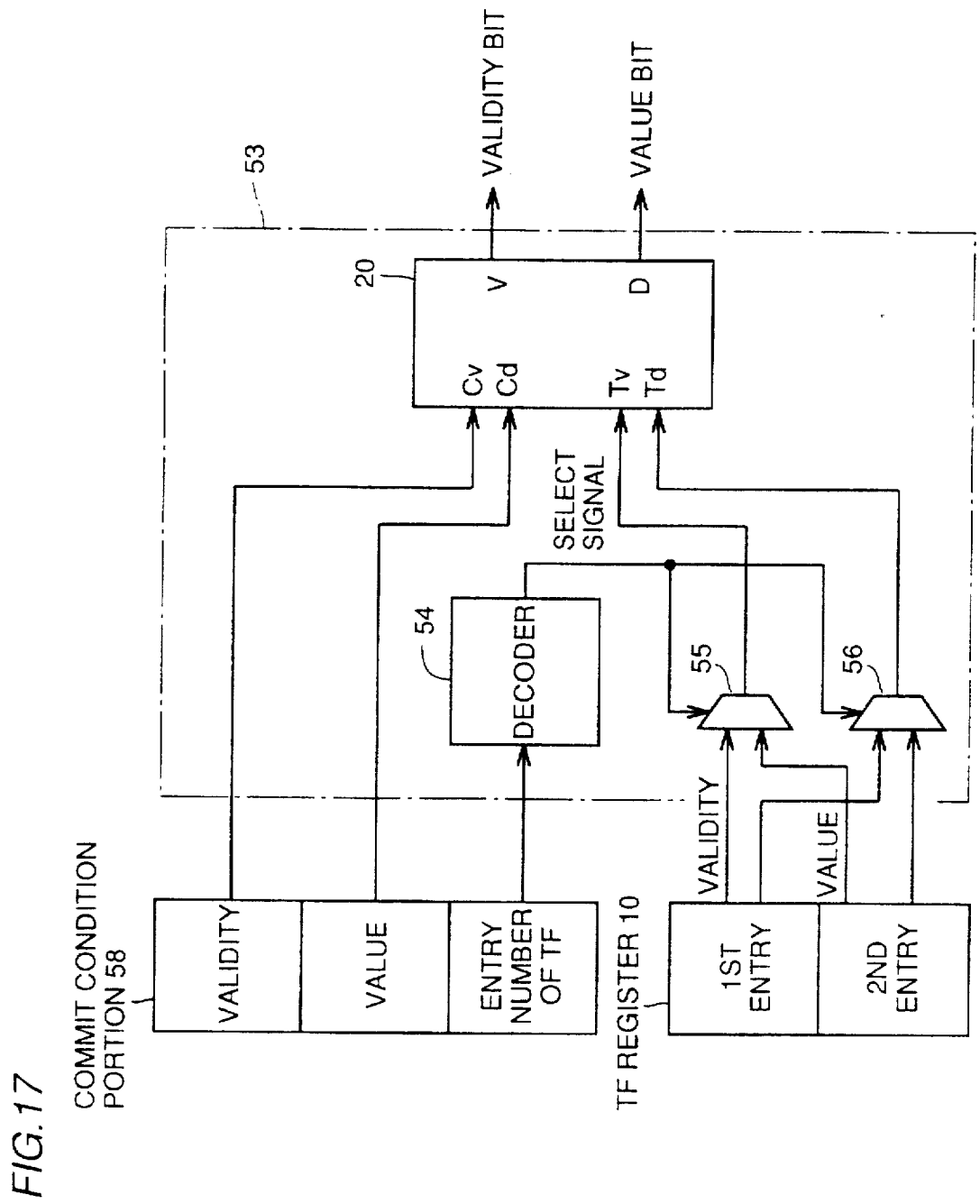
FIG. 17 is a block diagram showing the configuration of a commit condition calculation circuit in a microprocessor for processing instructions according to the programs shown in FIG. 16.

FIG. 17 is a block diagram showing the configurations of an execution control circuit and a commit condition calculation circuit in a commit control circuit in the microprocessor according to the third embodiment.

Referring to FIG. 17, commit condition calculation circuit 53 includes a comparison circuit 20, a decoder 54, and two selectors 55 and 56. Commit condition calculation circuit 53 compares commit control portion 58 and TF register 10 and produces validity bit V and value bit D based on the result.

Commit condition portion 58 is formed of a validity bit, a value bit, and a bit indicating the entry number of TF register 10 to be compared.

TF register 10 is substantially identical to the first embodiment. In the case of the program shown in FIG. 16, however, since an instruction can be executed irrespective of at east two conditions, and therefore TF register 10 only needs two entries.

Meanwhile, comparison circuit 20 in commit condition calculation circuit 53 is substantially identical to that in the first embodiment. Decoder 54 decodes the entry number of TF register 10 and produces a prescribed select signal. Selector 55 selects the validity bit of the first or second entry in TF register 10 in response to the select signal from decoder 51 and applies the selected validity bit Tv to comparison circuit 20. Selector 56 selects the value bit of the first or second entry in TF register 10 in response to a select signal from decoder 54 and applies the selected value bit Td to comparison circuit 20.

With instruction code "TF[1]?I2", for example, instruction 12 is to be executed only when the first entry in TF register 10 is "true". In this case, the bit indicating the entry number of TF register 10 of commit condition portion 58 specifies the first entry. Thus, the validity bit Tv and value Td of the first entry in TF register 10 are selected by selectors 55 and 56, respectively and applied to comparison circuit 20.

With instruction code "TF[2]?I4", the bit indicating the entry number of TF register 10 in commit condition portion 58 specifies the second entry in TF register 10. Thus, the validity bit Tv and value Td of the second entry in TF register 10 are selected by selectors 55 and 56, respectively, and applied to comparison circuit 20.

According to the third embodiment, commit condition portion 58 and commit condition calculation circuit 53 have more simplified configurations than the first embodiment.

Note that the microprocessor according to the third embodiment may be formed into a pipeline arrangement as that according to the second embodiment.

[Fourth Embodiment]

Figure 18:
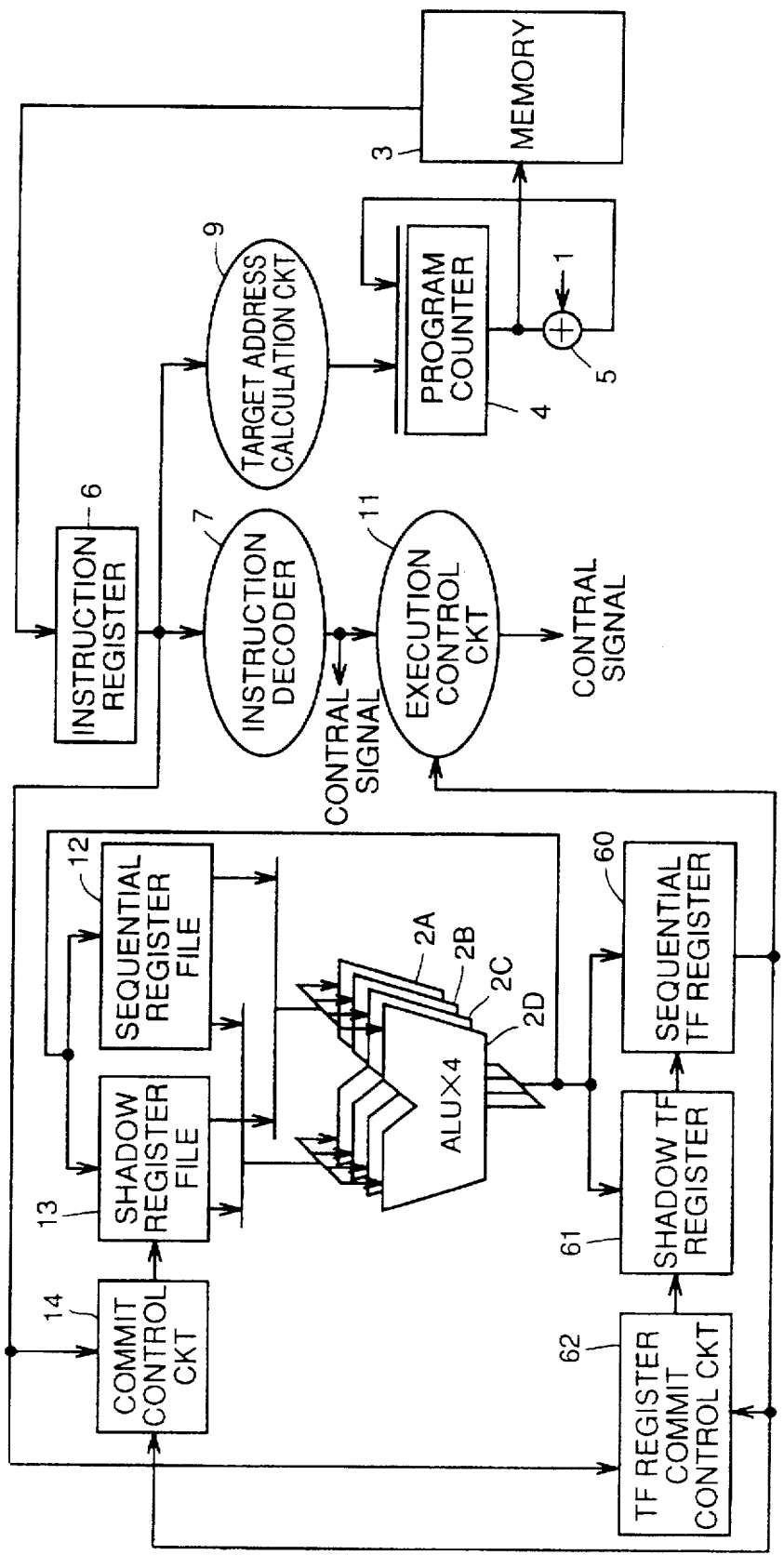
FIG. 18 is a block diagram showing the construction of a microprocessor according to a fourth embodiment of the invention.

FIG. 18 is a block diagram showing the configuration of a microprocessor according to a fourth embodiment of the invention.

Referring to FIG. 18, the microprocessor as opposed to the first embodiment includes a sequential TF register 60 instead of TF register 10, a shadow TF register 61 and a TF register commit control circuit 62.

Sequential TF register 60 corresponds to TF register 10 according to the first embodiment, and includes one or more entries which deterministically hold one of three pieces of information of if a certain condition is "true", "false" or "undetermined".

Shadow TF register 61 includes one or more entries which provisionally hold one of three pieces of information indicating that a certain condition is "true", "false", and the true/false is "undetermined".

When a condition instruction having the commit condition of "undetermined" is executed, TF register commit control circuit 62 holds the commit condition and transfers "true" or "false" stored in shadow TF register 61 to sequential TF register 60 at the point at which the true/false of the commit condition coincides with corresponding true/false in sequential TF register 10.

Note that TF register commit control circuit 62 has a substantially identical configuration to commit control circuit 14 according to the first embodiment.

FIG. 19 is a program list showing an example of program for the microprocessor.

According to the program, instruction code "TF[1]?C" is processed in the second cycle. With instruction code "TF[1]?C2", condition instruction C2 is supposed to be executed only when the first entry in sequential TF register 60 is "true".

The true/false of the first entry is however determined only when instruction code "always?C1" in the next third cycle is processed.

Accordingly, at this point in the second cycle, since the first entry in sequential TF register 60 is "undetermined", condition instruction C2 is provisionally executed, and the true/false is stored in the second entry in shadow TF register 61. Simultaneously with this, commit condition "TF[1]" is stored in the commit condition storage portion in TF register commit control circuit 62.

Then, with instruction code "always?C1" in the third cycle, condition instruction C1 is always executed and that true/false is stored in the first entry in sequential TF register 60.

TF register commit control circuit 62 always monitors sequential TF register 60. Therefore, when the true/false of the commit condition stored in the commit condition storage portion in TF register commit control circuit 62 coincides with the true/false of the first entry in sequential TF register 60, the true/false of condition instruction C2 stored in the second entry in shadow TF register 61 is transferred to the second entry in sequential TF register 60.

According to the fourth embodiment, in addition to simple operation instructions I2 and I3 having a commit condition being "undetermined", condition instruction C2 having a commit condition of "undetermined" can also be speculatively executed.

Note that according to the fourth embodiment, sequential TF register 60 and shadow TF register 61 correspond to the true/false hold unit. Commit control circuit 14 corresponds to the first commit control circuit. TF register commit control circuit 62 corresponds to the second commit control circuit.

[Fifth Embodiment]

FIG. 20 is a diagram showing the configuration of a register file in a microprocessor according to a fifth embodiment of the invention.

Referring to FIG. 20, the microprocessor includes a first register file 65 formed of 32 registers RA1 to RA32, a second register file 66 formed of 32 registers RB1 to RB32, and 32 flags F1 to F32.

According to the fifth embodiment, if an instruction is speculatively executed with the commit condition being "undetermined", the result data is provisionally stored in one of registers RA1 to RA32 in first register file 65 and a corresponding one of flags F1 to F32 is set to "0".

The flag is set to "1" at the moment when the true/false of the commit condition is determined and the true/false correspondingly coincides with the true/false in TF register.

Instead of physically transferring data from shadow register file 13 to sequential register file 12 as in the first embodiment, inverting the flag can change the stage of register files 65 and 66 from a speculative state to a sequential state as in the fifth embodiment.

[Sixth Embodiment]

The microprocessors according to the first to fifth embodiments are capable of executing speculative instructions, but encountered with a problem of how to process an exception which occurs in execution of such a speculative instruction, because it is unknown whether the result data is valid at the point at which such a speculative instruction is executed.

The simplest approach to the problem is to process an exception caused by a speculative instruction at the point at which the exception is caused similarly to a case of an exception caused by a sequential instruction.

The method is very simple but greatly lowers the processing efficiency of instructions. When an exception called "page fault" as described above is caused, for example, several hundreds of thousands of cycles will be necessary for a corresponding exception processing. However, if result data produced by executing the speculative instruction which has caused the page fault is not necessary, the several hundreds of thousands of cycles will be wasted.

Figure 21:
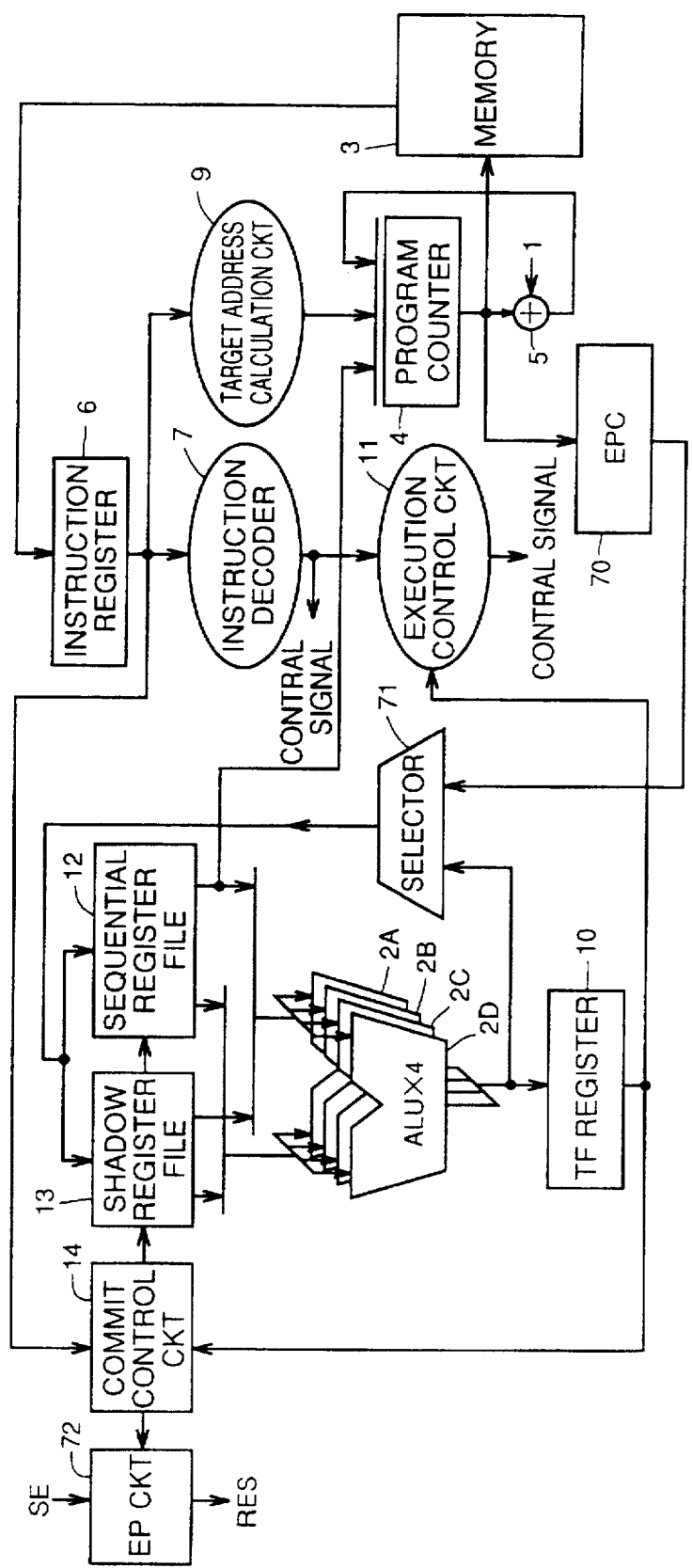
FIG. 21 is a block diagram showing the construction of a microprocessor according to a sixth embodiment of the present invention.

FIG. 21 is a block diagram showing the configuration of a microprocessor according to a sixth embodiment of the invention which is directed to a solution to a such a problem.

Referring to FIG. 21, the microprocessor as is the case with the microprocessor according to the first embodiment includes four ALU'S 2A to 2D, a memory 3, a program counter 4, an increment circuit 5, an instruction register 6, an instruction decoder 7, a target address calculation circuit 9, a TF register 10, an execution control circuit 11, a sequential register file 12, a shadow register file 13, and a commit control circuit 14.

The microprocessor as opposed to the microprocessor according to the first embodiment includes an EPC (Excepted Program Counter) 70, a selector 71, an EP (Excepted Pending) circuit 72.

EPC 70 stores an address stored in program counter 4 when an instruction fetched from memory 3 causes an exception. Selector 71 selects result data produced by ALU's 2A to 2D or the address stored in EPC 70 and supplies the same to sequential register file 12 or shadow register file 13. Note that EPC 70 and selector 71 are provided in the conventional microprocessor.

EP circuit 72 stores the fact that the speculative instruction has caused the exception in response to an exception generation signal SE indicating that the speculative instruction has caused the exception, and produces an exception processing signal RSE indicating the necessity of processing the exception at a prescribed point.

Such exception generation signal SE is produced in various locations depending upon the kind of exception. If the exception is a page fault, For example, exception generation signal SE is produced in the peripheral circuit of memory 3. If the exception is an overflow, exception generation signal SE is produced by ALU's 2A to 2D. If an undefined instruction is fetched exception generation signal SE is produced by instruction decoder 7.

Figure 22:
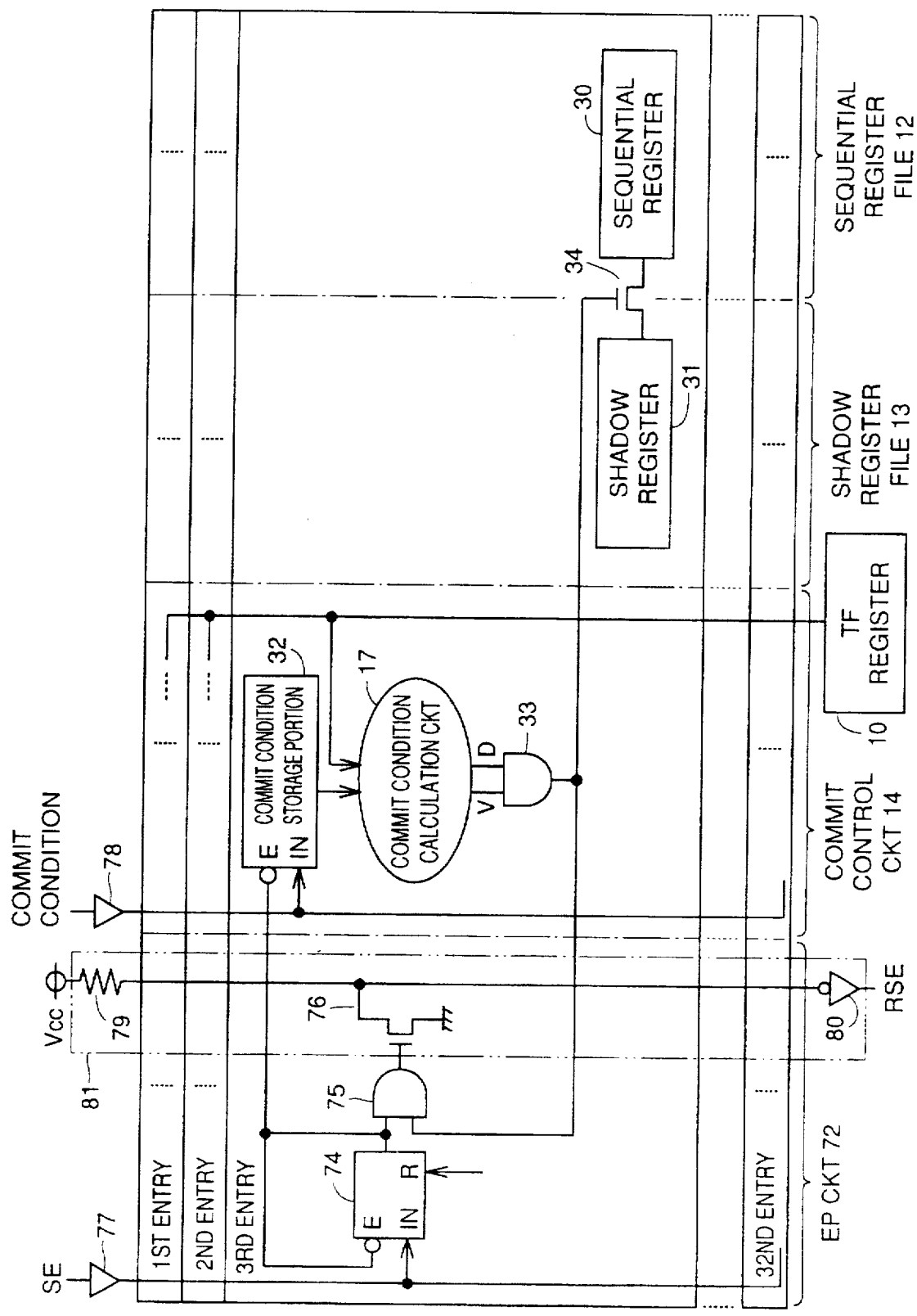
FIG. 22 is a block diagram showing the arrangement of a sequential register file, a shadow register file, a commit control circuit, and an EP circuit in the microprocessor shown in FIG. 21.

FIG. 22 is a block diagram showing the configuration of sequential register file 12, shadow register file 13, commit control circuit 14 and EP circuit 72.

Sequential register file 12, shadow register file 13 and commit control circuit 14 have substantially identical configurations to those according to the first embodiment.

As is the case with sequential register file 12, shadow register file 13 and commit control circuit 14, EP circuit 72 includes 32 entries. Each entry in EP circuit 72 includes a latch circuit 72, an NAND gate 72, and an N channel MOS transistor 76.

Latch circuit 74 includes an input terminal IN, an enable terminal E and a reset terminal R, and stores "1" or "0" in response to exception generation signal SE applied to input terminal IN through buffer 77. The output signal of latch circuit 7A is applied to its own enable terminal E. Therefore, in response to application of exception generation signal SE at H level to the input terminal of IN of latch circuit 74 through buffer 77, latch circuit 74 is set "1". At the time, since an H level output signal is applied to enable terminal E of a negative logic, latch circuit 74 will not be rewritten if a new exception generation signal SE is applied.

The output signal of latch circuit 74 and the output signal of AND gate 33 in commit control circuit 14 are applied to the input terminal of AND gate 75, the output signal of which is applied to the gate of N channel MOS transistor 76.

The 32 N channel MOS transistors 76 in the 32 entries together with a pull up resistor 79 and an invertor 80 forms an OR gate 81.

Commit condition storage portion 32 also includes input terminal IN and an enable terminal E, and stores commit condition portion 16 applied to input terminal IN through a buffer 78 when a speculative instruction is executed. The output signal of latch circuit 74 is also applied to the enable terminal E of commit condition storage portion 32. Therefore, when an exception occurs and "1" is stored in circuit 74, commit condition storage portion 32 will not be able to be rewritten.

Now, the operation of the microprocessor according to the sixth embodiment will now be described.

Figure 23:
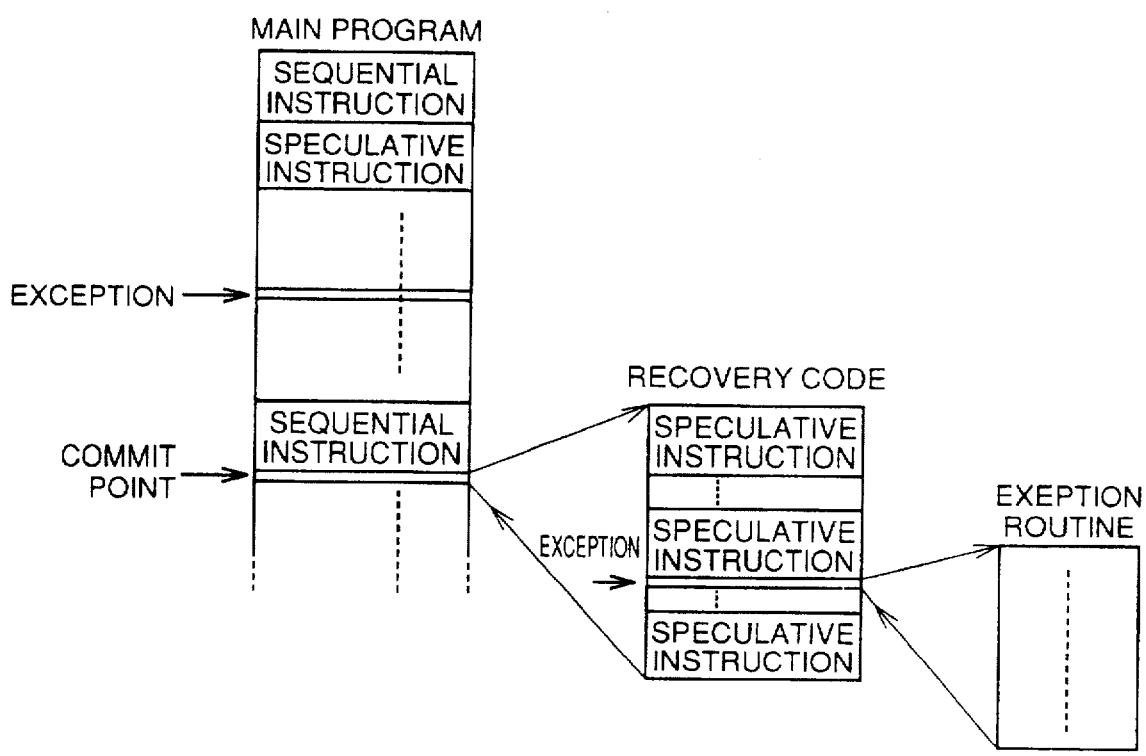
FIG. 23 is a timing chart for use in illustration of operations in an exception processing by the microprocessor shown in FIG. 21.

FIG. 23 is a timing chart or use in illustration of the operation of the microprocessor according to the sixth embodiment described above.

Various instructions are sequentially processed according to a main program including sequential instructions and speculative instructions. If execution of a speculative instruction causes an exception, the exception Will not be processed until a commit point.

A recovery code produced using software is prepared for each commit point. When the commit point is reached, the recovery code is executed from its first instruction.

The recovery code is formed by extracting only speculative instructions before the commit point from the main program. These speculative instructions are sequentially arranged and changed into a sequential instruction. When a speculative instruction having an exception which has occurred before is executed, the exception is once again generated as with the previous case. This time, however, a processing for the exception is immediately executed based on a prescribed exception routine. When the last instruction in the recovery code is executed, the process returns to the main program and the processing is resumed from the instruction next to the commit point.

The operation of the microprocessor according to the sixth embodiment will be described In more detail.

Assume that instruction with a commit condition TF[1] ?I2 causes an exception when the program shown in FIG. 11 is executed, for example.

In the first cycle, sequential instruction I1 is executed, a value stored in register r10 and a value stored in register r11 are added, and the result data is stored in the sequential register r2 of the second entry in sequential register file 12.

Simultaneously with this, speculative instruction I2 is executed. Since the first entry in TF register 10 corresponding to the commit condition TF[1] of instruction I2 is "undetermined" instruction I2 is speculatively executed. Thus, a value stored in register r12 and a value stored in register r13 are added, and the result data is stored in the shadow register r4 of the fourth entry in shadow register file 13.

Since instruction I2 causes an exception, exception generation signal SE of H level is applied to the latch circuit 74 of the fourth entry in EP circuit 72 through buffer 77. Thus, "1" is written in the latch circuit 74 of the fourth entry. Note that since instruction I2 has caused the exception, the result data is an arbitrary value.

Simultaneously with this, instructions with commit conditions I3 and I4 are executed. Since these instructions I3 and I4 are both speculative, the result data is stored in the shadow registers 31 of fifth and sixth entries in shadow register file 13.

However, since this instruction I3 and I4 do not cause an exception, exception generation signal SE of L level is applied to the latch circuit 74 of the fifth and sixth entries in EP circuit 72. Thus, "0" is stored in latch circuit 74.

Then, in the second cycle, sequential condition instructions C1 and C2 are executed simultaneously. If the value stored in the sequential register r2 of the second entry is smaller than the value stored in the sequential register r3 of the third entry "true" is set for the first entry in TF register 10. Thus, if the content stored in the commit condition storage portion 32 of the fourth entry in commit control circuit 14 coincides with the content stored in TF register 10, the output signal of AND gate 33 attains an H level.

This turns on transfer gate 34 in the fourth entry, and the result data of instruction I2 stored in the shadow register 31 of the fourth entry is transferred to the sequential register 30 of the fourth entry. Simultaneously with this, the AND gate 75 of the fourth entry in EP circuit 72 is turned on, and an output signal from its latch circuit 74 is applied to the gate of N channel MOS transistor 76.

Since the exception occurs when instruction I2 is executed in the first cycle, "1" has been set to latch circuit 74 of the fourth entry in EP circuit 72. Therefore, the output signal of latch circuit 74 attains an H level, and N channel MOS transistor 76 is turned on. This brings exception processing signal RSE to an H level. In response to exception processing signal RES of H level, the initial address of the exception handler is set in program counter 4. Thus, the exception processing is executed.

Meanwhile, if the value stored in the sequential register r2 of the second entry is not smaller than the value stored in the sequential register r3 of the third entry, "false" is set for the first entry TF register 10.

In this case, the output signal of AND gate 33 of the fourth entry in commit control circuit 14 does not attain an H level but is maintained at L level. The result data stored in the shadow register 31 of the fourth entry in shadow register file 13 will not be transferred to corresponding sequential register 30. An output signal of H level from latch circuit 74 will not be applied to the gate of N channel MOS transistor 76. Accordingly, exception processing signal RSE does not attain an H level and is maintained at L level. Therefore, the exception processing will not be executed.

As in the foregoing, by the microprocessor, if an exception is generated by executing speculative instruction I2, a processing for the exception is not immediately executed and deferred until a commit point at which the commit condition of speculative instruction I2 is satisfied, at which commit point exception processing is executed for the first time.

More specifically, the microprocessor knows at the commit point for the first time that speculative instruction I2 which has been executed has caused an exception, and drives the exception handler.

If an exception is generated when a speculative instruction is executed, meaningless result date is produced. Since there is a possibility that another speculative instruction has been executed based on such meaningless result data depending upon a program, once again executing the speculative instruction which has caused an exception after executing the exception processing is not enough, and the other speculative instructions must be executed again.

What is essentially necessary is to once again execute speculative instructions between occurrence of the exception and the commit point, it would be troublesome to extract only such speculative instructions from the main program. To this end, the microprocessor according to the sixth embodiment is configured to execute once again all the speculative instruction before the commit point.

Note that the routine (recovery code) formed of only the speculative instructions to be executed once again is prepared as a program for every commit point. Since the true/false for commit conditions have already been determined, their order is changed in order to sequentially execute these speculative instructions.

In the case of the program shown in FIG. 11, for example, at a commit point in the second cycle, a recovery code as shown in FIG. 24 is produced with software. As illustrated in FIG. 24, sequential instruction always ?I1 is not included in the recovery code. All the instructions in the recovery code have their order changed so as to be sequentially executed.

More specifically stated, since the true/false of the first entry in TF register 10 is determined when condition instruction C1 is executed, speculative instructions I2 and T3 having the true/false in the commit condition portions are arranged to be executed after condition instruction C1 is executed and made into sequential instructions. Since the true/false of the second entry in TF resister 10 is determined by executing condition instruction C2, speculative instruction I4 having the true/false of the first and second entries in the commit condition portion is placed to be executed after condition instructions C1 and C2 are executed, and made into a sequential instruction.

When instruction I2 is executed once again based on the recovery code, an exception is generated again. However, since instruction I2 in this case is a sequential instruction to be executed after the true/false of the first entry in TF register 10 is determined, the exception processing is immediately executed.

Since all the instructions in the recovery code are sequential, a speculative exception will not occur. At the end of the recovery code, a jump instruction jump for returning to the address next to the commit point is provided.

A method of calling the recovery code from the commit point is for example to prepare a jump table in a program which can be used for referring to the initial address of the recovery code using the address of the commit point as an index for example. According to such a method, it is only necessary to store a code to execute the program shown in FIG. 25 in an interruption handler.

According to the program, the initial address of a recovery code corresponding to the address of a particular commit point is called from the jump table in the first statement, and stored in a variable "recoveryCodeAddress". The "jumpTable" is a table in which the initial address of a recovery code corresponding to the address of each commit point is included.

In the second statement, the initial address of a recovery code is stored in program counter 4, and prescribed instructions are sequentially processed according to the recovery code.

In general, the EPC is a register for holding the address of an instruction which has caused an interruption, but EPC 70 according to the sixth embodiment is a register for holding the address of a commit point. More specifically, EPC 70 holds an address when an interruption is caused in response to exception processing signal RSE of H level.

Finally, a description follows on why latch circuit 74 and commit condition storage portion 32 are prohibited from being rewritten, when "1" is set in latch circuit 74 in EP circuit 72.

If rewriting is not prohibited, a problem is encountered when the program as shown in FIG. 26 is executed.

Assume that instruction I10 is executed and an exception is generated. Since instruction I10 is speculative, a processing for the exception is not immediately conducted, "1" is set in the latch circuit 74 of the first entry in EP circuit 72, and commit condition TF "1" is written in the commit condition storage portion 32 of the first entry in commit control circuit 14.

At the time, although result data produced by executing the speculative instruction is written in the shadow register 31 of the first entry in shadow register file 13, the result data is not a correct value, because the instruction has caused the exception.

Assuming that an exception does not occur when speculative instruction i11 is executed, if latch circuit 74 is not provided with means for prohibiting writing, "0" is set in latch circuit 74 in the first entry in EP circuit 72, which erases the storage that instruction I10 has caused the exception.

It is therefore necessary to prevent the content from being reset to "0" by another instruction when "1" is set in latch circuit 74 in EP circuit 72.

This also applies to commit condition storage portion 32 This is because commit condition storage portion 32 stores conditions for processing exceptions caused by speculative instructions, and therefore must not be rewritten with another instruction.

In the case of the program shown in FIG. 26, instruction I11 is executed based on the result data r1 of instruction I10. Since instruction I10 has caused an exception, result data r1 is not a correct value.

Re-executing a speculative instruction which has caused an exception is not enough. The microprocessor according to the sixth embodiment is therefore configured to re-execute all speculative instructions before the commit point.

As in the foregoing, according to the sixth embodiment, since a processing for an exception caused by executing a speculative instruction is not immediately conducted and such an exception processing is executed if necessary at a commit point, an exception processing will not be wasted. Therefore, instructions can be processed more efficiently and at higher speed.

Note that in the sixth embodiment, latch circuit 74 corresponds to the exception storage circuit, EPC 70, selector 71 and the like correspond to the exception processing unit.

[Seventh Embodiment]

According to the sixth embodiment, instructions can be processed more efficiently without excess exception processings, but is encountered with a disadvantage that in order to provide a recovery code provided at each commit point and a jump table for calling the recovery code, the binary size of a program increases, and therefore a large area of the storage region of the disc is occupied.

Since the initial address of a recovery code is written in each entry of the jump table, for a 32-bit microprocessor, for example the size of each entry in the jump table is 4 bytes. Herein, a group of instructions issued in parallel will be referred to as an instruction block. The initial address of a recovery code is necessary for every commit point, and therefore the size of the jump table is largest when all instruction blocks are commit points.

Meanwhile, a recovery code has speculative instructions sequentially placed in a main program, and therefore the size of the recovery code is equal or slightly larger than the size of the main program. Assuming that the size of the recovery code is roughly equal to the size of the main program, the size of the recovery code corresponding to one Instruction block is 20 bytes for a microprocessor issuing four 5-byte instructions, in other words a microprocessor whose one instruction block corresponds to 20 bytes.

Therefore, the ratio of increase in binary size of the entire program relative to the binary size of only the main program is given as follows:

$$\text{Increase in binary size of program} = \frac{\text{binary size of main program} + \text{jump table size} + \text{recovery code size}}{\text{binary size of main program}}$$

$$= \frac{(5 \text{ bytes} \times 4 \text{ instructions}) + (4 \text{ bytes}) + (5 \text{ bytes} \times 4 \text{ instructions})}{5 \text{ bytes} \times 4 \text{ instructions}}$$

$$= \frac{20 + 4 + 20}{20}$$

$$= 2.2$$

As can be seen from the expression, the binary size of the entire program including the jump table and the recovery code is about 2.2 times as large as the binary size of only the main program.

In the sixth embodiment, even for a very small possibility of occurrence of an exception, a high possibility of occurrence of excess two cash misses or page faults is expected by referring to the jump table and executing the recovery code, and therefore the performance may deteriorate more.

In addition, since instructions are rearranged to be sequential in a recovery code, hardware capable of executing speculative instructions cannot be effectively used.

Figure 27:
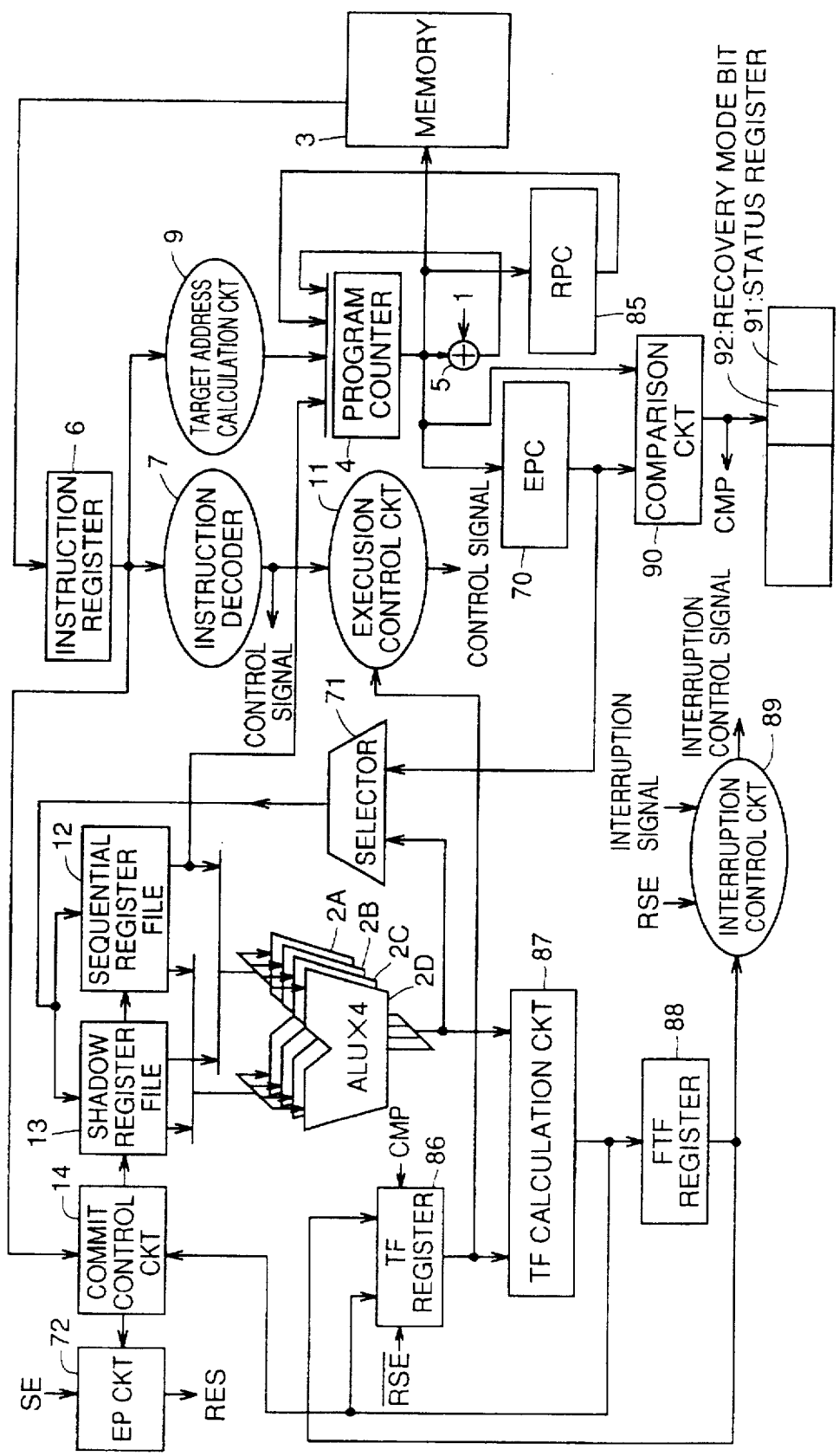
FIG. 27 is a block diagram showing the construction of a microprocessor according to a seventh embodiment of the invention.

FIG. 27 is a block diagram showing the configuration of an entire microprocessor according to a seventh embodiment of the invention, which is directed to a solution to such a problem.

Referring to FIG. 27, the microprocessor includes a recovery program counter (RPC) 85 for storing target addresses for branch instructions, a TF register 86 for holding condition information indicating that each condition is "true", "false", or "undetermined", a true/false calculation circuit (TF calculation circuit) 87 for adding condition information obtained from TF register 86 and condition information obtained from ALU's 2A to 2D for output, a future true/false register (FTF register) 88 for holding condition information obtained from TF calculation circuit 87, an interruption control circuit 89 for producing an interruption control signal in response to an exception processing signal RSE, an interruption signal or the like, a comparison circuit 90 for comparing the value of program counter 4 and value of EPC 70 and producing a comparison signal CMD of H level in response to a coincidence between them, and a status register 91 having a recovery mode bit 92 which is reset in response to comparison signal CMP of H level.

As opposed to TF register 10 in the above-described embodiments, TF register 86 accepts condition information from TF calculation circuit 87 only during the period in which exception processing signal RSE is at "L" level. More specifically, rewriting of condition information in TF register 10 is prohibited curing the period in which exception processing signal RSE is at "H" level. TF register 86 also accepts condition information from FTF register 88 in response to comparison signal CMP of H level.

TF calculation circuit 87 includes m entries corresponding to entries to TF register 86. Each entry of TF calculation circuit 87 outputs condition information in a corresponding entry in TF register 86 as it is if corresponding condition information is not supplied from ALU's 2A to 2D, and outputs corresponding condition information applied from ALU's 2A to 2D if such information is applied.

Therefore, when the first and second entries in TF register 86 hold "undetermined", and the third entry holds "true", and condition information supplied from ALU's 2A to 2D is that corresponding condition to the first entry is "true", TF calculation circuit 87 outputs "true" from the first entry, "undetermined" from the second entry, and "true" from the third entry. When the first entry in TF register 86 holds "false", the second entry holds "true" the third entry holds "undetermined", and condition information supplied from ALU's 2A to 2D is that corresponding condition to the third entry is "false", TF calculation circuit 87 outputs "false" from the first entry, "true" from the second entry and "false" from the third entry.

FTF register 88 similarly to TF register 86 includes m entries. Each entry of FTF register 88 holds one of information about if a corresponding condition is to be "true", "false", or "undetermined" in the future.

Interruption control circuit 89, as is the case with the interruption control circuit in the conventional microprocessor, produces an interruption control signal in response to an interruption signal. The interruption signal is supplied from the portion at which an exception such as overflow and page fault is generated. Exception processing signal RSE supplied from EP circuit 72 to interruption control circuit 89 is such an interruption signal. Interruption control signal 89 therefore produces an interruption control signal also in response to exception processing signal RSE.

In response to generation of an interruption control signal, the exception handler is called, and an exception processing corresponding to the generated exception is conducted. An interruption control signal is produced in response to exception processing signal RSE, and if the exception handler is called in response, the recovery mode bit 92 of status register 91 is set to "1". Thus, a recovery mode which will be described below Is attained. The exception handler called in response to exception processing signal RSE stores the value of RPC 85 in program counter 4.

Interruption control circuit 89 compares a commit condition included in an instruction being processed and the condition information of FTF register 88 when the recovery mode 92 is set "1" and an interruption signal is generated, produces an interruption control signal when the commit condition is satisfied, and the exception handler called in response conducts a corresponding exception processing.

The operation of the microprocessor according to the seventh embodiment will be described. As is the case with the sixth embodiment, assume that an exception is caused by an instruction with a commit condition I2 when the program shown in FIG. 11 is executed.

When an address in the first cycle in a program is stored in program counter 4 according to a certain branch instruction, execution moves to basic block K1. The address stored in program counter 4 at the time is also stored in RPC 85.

In the first cycle, four instructions I1 to I4 are executed simultaneously. If instruction I2 is speculatively executed, a value stored in register r12 and a value stored in register r13 are added, and the result data is stored in the shadow register in the fourth entry in shadow resister file 13.

Instruction I2 which causes an exception is speculative and therefore a processing for the exception is not immediately conducted. "1" is set in latch circuit 74 in the fourth entry EP circuit 72 instead. Commit condition TF[1] thereof is stored in commit condition storage portion 32 in the fourth entry in commit control circuit 14.

Subsequently in the second cycle, two condition instructions C1 and C2 are sequentially executed. If a value in register file r2 is smaller than a value in register file r3, condition information of "true" is output from the first entry in TF calculation circuit 87 based on condition information from ALU's 2A to 2D. Thus, commit condition TF[1] stored in commit condition storage portion 32 in the fourth entry in commit control circuit 14 coincides with condition information applied from TF calculation circuit 87, and therefore exception processing signal RSE from EP circuit 72 rises to an H level. Interruption control circuit 89 writes the value of program counter 4 at the time in EPC 70 in response to exception processing signal RSE of H level. Therefore, the address of instruction of I2 which causes an exception is not written as it is, but the address of condition instruction C2 to establish the commit condition TF[1] of instruction I2 is written.

Condition information from TF calculation circuit 87 is written in FTF register 88. If a value in register r2 is smaller than a value in register r3, and a value in register r4 is equal to a value in register r5, condition information of "true" is output from both first and second entries of TF calculation circuit 87. The condition information of "true" is written in both first and second entries in FTF register 88.

Since exception processing signal RSE is at "H" level at the time, these condition information from TF calculation circuit 87 is not written in TF register 86. More specifically, although the first and second entries in TF register 10 become "true" at this point according to the sixth embodiment, the first and second entries in TF register 86 are maintained as "undetermined" according to the seventh embodiment, and the first and second entries in FTF register 88 become "true" instead.

The exception handler is activated in response to an interruption control signal from interruption control circuit 89. The exception handler sets the recovery mode bit 92 of status register 91 to "1", and the value of RPC 85 in program counter 4. Thus, the microprocessor changes its mode from a usual mode to a recovery mode.

Since RPC 85 stores the addresses of instructions I1 to I4 in the first cycle, the instructions are re-executed from the first cycle. In the recovery mode, execution control circuit 11 executes only speculative instructions by referring Lo TF register 86. Therefore in the first cycle, three speculative instruction I2 to I4 among the four instructions are executed and sequential instruction I1 is not executed.

Since instruction I2 is executed, an exception is once again generated. At the time, it is checked whether the commit condition TF[1] of instruction I2 is to be "true" or "false" in the future by referring to the first entry in FTF register 88. Since the first entry in FTF register 88 is "true", an exception processing is conducted in response to the interruption control signal generated by interruption control circuit 89. Although the first entry in TF register 86 is still "undetermined", the exception processing is conducted based on the information that the first entry will necessarily be "true" in the future.

Herein, if instruction I3 also causes an exception, the commit condition of instruction I3 is TF[1], the first entry in FTF register 88 is "true", and therefore the exception processing will not be conducted. Herein, the first entry in FTF register 38 is "true", and in the case of "undetermined", as is the case with a usual mode, latch circuit 74 in the fifth entry in EP circuit 72 is set "1" in response to exception generation signal SE of H level.

This exception processing is conducted simultaneously with occurrence of the exception as is the case with a usual exception processing, and once the exception processing is completed, the addresses of instructions C1 and C2 next to instruction I2 which has caused the exception are stored in program counter 4, and execution is resumed from these instructions C1 and C2. The value of program counter 4 is therefore equal to the value of EPC 70 and therefore comparison circuit 90 produces comparison signal CMP of H level. In response to comparison signal CMP of H level, TF register 80 stores condition information from FTF register 88, and the recovery mode bit 92 of status register 91 is reset to "0". Thus, the microprocessor returns from the recovery mode to the usual mode.

The seventh embodiment does not need a recovery code and a jump table to call the recovery code which are necessary according to the sixth embodiment, it is not necessary to particularly expand the binary size of the program in order to conduct exception processings. In addition, since re-execution for recovery is conducted based on the original program, the possibility of an exception such as cash miss and page fault is extremely low. Furthermore, when re-execution is conducted for the purpose of recovery, the microprocessor is capable of speculatively executing instructions, and therefore the function of the processor capable of speculative execution can be more effectively utilized.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of processing an instruction having a predetermined execution condition for a result of executing said instruction being valid, said execution condition composed of logical operation conditions of one or more branch instructions, said method comprising the steps of:

determining any of said branch conditions;

comparing the execution condition with the already determined branch condition;

producing result data by executing the instruction after the comparison;

deterministically holding the produced result data in a first case in which true/false for all branch conditions in the execution condition correspondingly coincides with true/false for the already determined branch conditions, and provisionally holding the produced result data in a second case in which true/false for any of the branch conditions in the execution condition correspondingly coincides with true/false for the already determined branch condition and the other of the branch conditions in the execution condition is not yet determined in said second case, determining the other branch condition; and in said second case, deterministically reholding the provisionally held result data when true/false for all branch conditions in the execution condition correspondingly coincides with true/false for the already determined all branch conditions.

2. A method of processing as recited in claim 1, further comprising the steps of:

upon an occurrence of an exception during processing the instruction and in said first case, immediately handling the exception;

upon an occurrence of an exception during processing the instruction and in the second case, storing the occurrence of the exception; and when the occurrence of the exception is stored, handling the exception at said step of reholding.

3. A method of processing as recited in claim 1, further comprising the steps of:

upon an occurrence of an exception during processing the instruction and in said first case, immediately handling the exception, and upon an occurrence of an exception during processing the instruction and in said second case, storing the occurrence of the exception;

reprocessing all instructions which have been processed until said step of reholding when the occurrence of the exception is stored at said step of reholding; and immediately handling the exception upon a re-occurrence of the exception during reprocessing the instruction.

4. A method of processing an instruction having a predetermined execution condition for the result of executing said instruction being valid, said execution condition composed or one or more branch conditions under pipeline control through a plurality of processing stages, said method comprising the steps of:

determining any of said branch conditions;

comparing the execution condition with the already determined branch condition in one of said plurality of processing stages;

in a first case in which true/false for all branch conditions in the execution condition correspondingly coincides with true/false for the already determined branch condition, producing first handling information indicating that result data to be produced by execution of the instruction should be deterministically held at the time of moving to a succeeding stage, and in a second case in which true/false for any of the branch conditions in the execution condition correspondingly coincides with true/false for the already determined branch condition and the other of the branch conditions in the execution condition is not yet determined, producing second handling information indicating that result data to be produced by execution of the instruction should be provisionally held at the time of moving to a succeeding stage;

producing result data by executing the instruction after the comparison;

deterministically holding the produced result data based on the first handling information in said first case and provisionally holding the produced result data based on the second handling information in said second case;

in said second case, determining the other branch condition; and in said second case, deterministically reholding the provisionally held result data when true/false for all branch conditions in the execution condition correspondingly coincides with true/false for the already determined all branch conditions.

5. A method of processing as recited in claim 4, further comprising the steps of:

recomparing the execution condition with the already determined branch condition after producing the first or second handling information in another stage after said one processing stage; and changing the second handling information to the first handling information at the time of moving to a succeeding processing stage, when the result of the recomparison indicates that said second case is changed to said first case.

6. A processor for processing an instruction having a predetermined execution condition for that result of executing said instruction being valid, said execution condition composed of logical operation or one or more branch conditions; said processor comprising:

operation means for executing the instruction and determining said branch conditions;

data hold means for deterministically or provisionally holding result data produced by execution of the instruction by said operation means;

true/false hold means including one or more entries corresponding to said one or more branch conditions, said entries each holding one of first condition information indicating that a corresponding branch condition is true, second condition information indicating that the corresponding branch condition is false, and third condition information indicating that true/false for the corresponding branch condition is undetermined;

execution control means for comparing the execution condition with the condition information obtained from said true/false hold means, (i) controlling said data hold means to deterministically hold result data in a first case in which true/false for all branch conditions in the execution condition correspondingly coincides with the condition information, and (ii) controlling said data hold means to provisionally hold result data in a second case in which true/false for any of the branch conditions in the execution condition correspondingly coincides with any of the condition information and the other of the condition information is the third condition information; and commit control means for comparing the execution condition with the condition information obtained from said true/false hold means and controlling said data hold means to deterministically rehold the result data provisionally held, when true/false for all branch conditions in the execution condition correspondingly coincides with the condition information.

7. A processor as recited in claim 6, wherein said data hold means includes, first register means for deterministically holding the result data, and second register means for provisionally holding the result data.

8. A processor as recited in claim 7, wherein said execution control means includes, comparison means for comparing the execution condition with the condition information obtained from said true/false hold means, and means for (i) controlling said first register means to hold the result data in said first case, and (ii) controlling said second register means to hold the result data in said second case.

9. A processor as recited in claim 8, wherein said commit control means includes, storage means for storing the execution condition, comparison means for comparing the execution condition stored in said storage means with the condition information obtained from said true/false hold means, and transfer means for transferring the result data held by said second register means to said first register means when true/false for all branch conditions in the execution condition correspondingly coincides with the condition information as a result of comparing by said comparison means.

10. A processor as recited in claim 6, wherein said data hold means includes a flag for specifying whether said data hold means holds the result data deterministically or provisionally.

11. A processor as recited in claim 6, wherein a condition instruction for determining at least one branch condition of said branch conditions has a second execution condition for the result of executing said condition instruction is valid, said second execution condition composed of logical operation of one or more second branch conditions, each entry of said true/false hold means holds the condition information deterministically or provisionally, said execution control means compares the second execution condition with the condition information obtained from said true/false hold means, (i) in a third case in which true/false for all second branch conditions in the second execution condition correspondingly coincides with the condition information, controls said true/false hold means to deterministically hold the first or second condition information produced by determination of the second branch condition by said operation means according to the condition instruction, and (ii) in a fourth case in which true/false for any of the second branch condition in the second execution condition correspondingly coincides with any of the condition information the other of the condition information is the third condition information, controls said true/false hold means to provisionally hold the first or second condition information produced by determination of the second branch condition by said operation means according to the condition instruction, and said processor further comprising second commit control means for comparing the second execution condition with the condition information obtained from said true/false hold means and controls said true/false hold means to rehold deterministically the first or second condition information held provisionally by said true/false hold means, when true/false for all second branch conditions in the second execution condition correspondingly coincide with the condition information.

12. A processor as recited in claim 11, wherein said true/false hold means includes, first true/false register means including one or more entries corresponding to said one or more second branch conditions, each said entry deterministically holding the condition information, and second true/false register means including one or more entries corresponding to said one or more second branch conditions, each said entry provisionally holding the condition information.

13. A processor as recited in claim 6, further comprising, exception storage means, when an exception occurs during the period of processing the instruction and in said second case, for storing the occurrence of the exception, and exception handling means for handling the exception when the true/false for all branch conditions in the execution condition correspondingly coincides with the condition information if said exception storage means stores the occurrence of the exception.

14. A processor as recited in claim 13, wherein said exception handling means further includes reprocessing means for reprocessing an instruction the result data of which is provisionally held at least between the occurrence of the exception and time when true/false for all branch conditions in the execution condition correspondingly coincides with the condition information, before the exception is handled.

15. A processor as recited in claim 14, wherein said reprocessing means sequentially reprocesses a plurality of instructions the result data of which are provisionally held.

16. A processor as recited in claim 13, wherein said exception storage means has its storage content prohibited from being rewritten while storing the occurrence of the exception.

17. A processor as recited in claim 6, further comprising:

true/false calculation means for adding condition information produced by determination of the branch condition by said operation means to condition information obtained from said true/false hold means;

exception storage means for storing an occurrence of an exception when the exception occurs during processing the instruction and in said second case;

future true/false hold means for holding the condition information obtained from said true/false calculation means;

reprocessing means for reprocessing instructions which have been already processed until true/false for all branch conditions in the execution condition correspondingly coincides with the condition information if said exception storage means stores the occurrence of the exception when true/false for all branch conditions in the execution condition correspondingly coincides with the condition information; and exception handling means for comparing said execution condition corresponding to an instruction which caused the exception with condition information obtained from said future true/false hold means when the exception occurs again during the period in which said reprocessing means are reprocessing the instruction, and handling the exception if true/false for all branch conditions in the execution condition coincides with the condition information, said true/false hold means refusing to accept the condition information obtained from said true/false calculation means during the period in which said reprocessing means are reprocessing the instruction, otherwise accepting the condition information, and accepting the condition information obtained from said future true/false hold means when the reprocessing of the instruction by said reprocessing means is completed.

18. A processor as recited in claim 17, wherein said reprocessing means selectively reprocesses the instruction in said second case among the instructions.

19. A processor as recited in claim 17, wherein said exception storage means has its storage content prohibited from being rewritten while storing the occurrence of the exception.

20. A processor for processing an instruction having a predetermined execution condition for the result of executing said instruction being valid, said execution condition composed of logical operation of one or more branch conditions under pipeline control through a plurality of processing stages, said processor comprising:

operation means for executing the instruction and determining said branch conditions;

data hold means for deterministically or provisionally holding result data produced by execution of the instruction by said operation means;

true/false hold means including one or more entries corresponding to said one or more branch conditions, each said entry holding one of first condition information indicating that a corresponding branch condition is true, second condition information indicating that the corresponding branch condition is false, and third condition information indicating that true/false for the corresponding branch condition is undetermined;

information producing means in one of said plurality of processing stages for comparing the corresponding execution with condition information obtained from said true/false hold means, (i) in a first case in which true/false for all branch conditions in the execution condition correspondingly coincides with the condition information, producing first handling information indicating that result data to be produced by execution of the instruction by said operation means at the time of moving to a succeeding stage is deterministic, and (ii) in a second case in which true/false for any of the branch conditions in the execution condition correspondingly coincides with any of the condition information and the other of the condition information is the third condition information, producing second handling information indicating that result data to be produced by execution of the instruction by said operation means at the time of moving to a succeeding processing stage is provisional;

write control means controlling said data hold means (i) to deterministically hold result data produced by said operation means according to the first handling information in said first case, and (ii) to provisionally hold result data produced by said operation means according to the second handling information in said second case; and commit control means for comparing the execution condition with the condition information obtained from said true/false hold means and controlling said data hold means to deterministically rehold the result data provisionally held when true/false for all branch conditions in the execution condition correspondingly coincides with the condition information.

21. A processor as recited in claim 20, further comprising information change means for changing the second handling information to the first handling information at the time of moving to a succeeding processing stage in another processing stage after said one processing stage in which said information producing means produces the first or second handling information, when said second case is changed to said first case.

* * * * *